(12) United States Patent
Nam et al.

(10) Patent No.: US 12,284,664 B2
(45) Date of Patent: Apr. 22, 2025

(54) TECHNIQUES FOR DERIVING A SOUNDING REFERENCE SIGNAL-BASED MULTI-TRANSMISSION AND RECEPTION POINT DOWNLINK PRECODING

(71) Applicant: QUALCOMM Incorporated, San Diego, CA (US)

(72) Inventors: Wooseok Nam, San Diego, CA (US); Tao Luo, San Diego, CA (US); Xiaoxia Zhang, San Diego, CA (US); Mostafa Khoshnevisan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/491,355

(22) Filed: Sep. 30, 2021

(65) Prior Publication Data
US 2022/0132526 A1 Apr. 28, 2022

Related U.S. Application Data

(60) Provisional application No. 63/105,194, filed on Oct. 23, 2020.

(51) Int. Cl.
*H04W 72/54* (2023.01)
*H04L 5/00* (2006.01)
(Continued)

(52) U.S. Cl.
CPC ........... *H04W 72/54* (2023.01); *H04L 5/0051* (2013.01); *H04W 72/046* (2013.01); *H04W 72/23* (2023.01)

(58) Field of Classification Search
CPC ... H04W 72/54; H04W 72/046; H04W 72/23; H04L 5/0051; H04L 5/0023; H04L 5/0094; H04B 7/024
See application file for complete search history.

(56) References Cited

U.S. PATENT DOCUMENTS

2022/0030620 A1\* 1/2022 Cirik ...................... H04B 7/088
2022/0052742 A1\* 2/2022 Huang ................. H04B 7/0404
(Continued)

FOREIGN PATENT DOCUMENTS

WO WO-2020200124 A1 \* 10/2020 ............... H04L 1/16

*Primary Examiner* — Shailendra Kumar
(74) *Attorney, Agent, or Firm* — Holland & Hart LLP

(57) ABSTRACT

Methods, systems, and devices for wireless communications are described. In some systems, a user equipment (UE) may receive a sounding reference signal (SRS) resource configuration indicating one or more resources over which the UE may transmit one or more SRSs to one or more transmission and reception points (TRPs) within a multi-TRP communications system applying a multi-TRP communication scheme. The SRS resource configuration may configure the one or more resources based on a type of multi-TRP communication scheme being applied by multiple TRPs within the multi-TRP communications system and the UE may support SRS-based channel state information (CSI) acquisition within the multi-TRP communication scheme based on transmitting one or more SRSs over the configured resources. The UE may also receive configurations indicating spatial relations between each configured resource, two or more downlink reference signals, and a demodulation reference signal of an associated downlink transmission.

30 Claims, 20 Drawing Sheets

(51) Int. Cl.
*H04W 72/044* (2023.01)
*H04W 72/23* (2023.01)

(56) References Cited

U.S. PATENT DOCUMENTS

| | | | | |
|---|---|---|---|---|
| 2022/0303079 A1* | 9/2022 | He | ............ | H04W 72/20 |
| 2023/0021652 A1* | 1/2023 | Xiao | ............ | H04L 1/08 |
| 2023/0080392 A1* | 3/2023 | Chen | ............ | H04W 72/23 |
| | | | | 370/329 |
| 2023/0171763 A1* | 6/2023 | Gao | ............ | H04W 52/58 |
| | | | | 370/329 |

* cited by examiner

TECHNIQUES FOR DERIVING A SOUNDING REFERENCE SIGNAL-BASED MULTI-TRANSMISSION AND RECEPTION POINT DOWNLINK PRECODING

CROSS REFERENCE

The present application for patent claims the benefit of U.S. Provisional Patent Application No. 63/105,194 by NAM et al., entitled "TECHNIQUES FOR DERIVING A SOUNDING REFERENCE SIGNAL-BASED MULTI-TRANSMISSION AND RECEPTION POINT DOWNLINK PRECODING," filed Oct. 23, 2020, assigned to the assignee hereof, and expressly incorporated by reference herein.

TECHNICAL FIELD

The following relates to wireless communications, including techniques for deriving a sounding reference signal (SRS)-based multi-transmission and reception point (TRP) downlink precoding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with multiple transmission and reception points (TRPs). In such multi-TRP communications systems, the UE may receive a joint or coordinated transmission from the multiple TRPs according to a multi-TRP communication scheme.

SUMMARY

The described techniques relate to improved methods, systems, devices, and apparatuses that support techniques for deriving a sounding reference signal (SRS)-based multi-transmission and reception point (TRP) downlink precoding. Generally, the described techniques provide for a configuration of one or more SRS resources over which a user equipment (UE) may transmit SRS to one or more TRPs within a multi-TRP communications system to support an SRS-based derivation of channel state information (CSI). For example, the UE may communicate with multiple TRPs within a multi-TRP communications system such that the UE may receive coordinated transmissions from the multiple TRPs. In some aspects, the multiple TRPs may coordinate transmissions to the UE based on applying a multi-TRP communication scheme, such as a time-division multiplexing (TDM) communication scheme, a frequency-division multiplexing (FDM) communication scheme, a space-division multiplexing (SDM) communication scheme, or a single-frequency network (SFN) communication scheme.

In some implementations, one or more of the multiple TRPs to which the UE communicates may determine the SRS resource configuration based on the type of multi-TRP communication scheme being applied by the multiple TRPs. For instance, in examples in which the multiple TRPs communicate with the UE by applying an SFN communication scheme or an SDM communication scheme, the SRS resource configuration may indicate one SRS resource over which the UE may transmit SRS to the multiple TRPs (e.g., each if not all of the multiple TRPs). Alternatively, in examples in which the multiple TRPs communicate with the UE by applying a TDM communication scheme or an FDM communication scheme, the SRS resource configuration may indicate multiple SRS resources such that the UE may transmit an SRS to each of the multiple TRPs over a different SRS resource.

The UE may receive the SRS resource configuration from one of the multiple TRPs and may transmit one or more SRSs according to the SRS resource configuration. The TRPs that receive an SRS may derive a CSI (e.g., a downlink CSI) based on the received SRS, may determine a downlink precoding based on the derived CSI, and may transmit a downlink transmission to the UE using the determined downlink precoding. In some implementations, the TRPs that receive an SRS may additionally determine a multi-TRP communication scheme to apply based on the CSI and may transmit the downlink transmission according to the determined multi-TRP communication scheme.

A method for wireless communication at a UE is described. The method may include receiving an SRS resource configuration indicating at least one SRS resource, the SRS resource configuration based at least in part on a first multi-TRP communication scheme applied by two or more TRPs, transmitting one or more SRSs over the at least one SRS resource according to the SRS resource configuration, and receiving a downlink transmission from at least one of the two or more TRPs, the downlink transmission based at least in part on the one or more SRSs.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive an SRS resource configuration indicating at least one SRS resource, the SRS resource configuration based at least in part on a first multi-TRP communication scheme applied by two or more TRPs, transmit one or more SRSs over the at least one SRS resource according to the SRS resource configuration, and receive a downlink transmission from at least one of the two or more TRPs, the downlink transmission based at least in part on the one or more SRSs.

Another apparatus for wireless communication at a UE is described. The apparatus may include means for receiving an SRS resource configuration indicating at least one SRS resource, the SRS resource configuration based at least in part on a first multi-TRP communication scheme applied by two or more TRPs, means for transmitting one or more SRSs over the at least one SRS resource according to the SRS resource configuration, and means for receiving a downlink transmission from at least one of the two or more TRPs, the downlink transmission based at least in part on the one or more SRSs.

A non-transitory computer-readable medium storing code for wireless communication at a UE is described. The code may include instructions executable by at least one processor to receive an SRS resource configuration indicating at least one SRS resource, the SRS resource configuration based at least in part on a first multi-TRP communication scheme applied by two or more TRPs, transmit one or more SRSs over the at least one SRS resource according to the SRS resource configuration, and receive a downlink transmission from at least one of the two or more TRPs, the downlink transmission based at least in part on the one or more SRSs.

Some examples of the method, apparatuses, and non-transitory computer-readable medium described herein may further include operations, features, means, or instructions for receiving a configuration associating the at least one SRS resource with two or more downlink reference signals, each of the two or more downlink reference signals from one of the two or more TRPs.

In some examples of the method, apparatuses, and non-transitory computer-readable medium described herein, receiving the configuration associating the at least one SRS resource with the two or more downlink reference signals may include operations, features, means, or instructions for receiving an indication of a spatial relation between the at least one SRS resource and the two or more downlink reference signals.

In some examples of the method, apparatuses, and non-transitory computer-readable medium described herein, receiving the configuration associating the at least one SRS resource with the two or more downlink reference signals may include operations, features, means, or instructions for receiving an indication, for the at least one SRS resource, of an uplink TCI state associated with the two or more downlink reference signals.

In some examples of the method, apparatuses, and non-transitory computer-readable medium described herein, the two or more downlink reference signals comprise two or more CSI reference signals (CSI-RSs), two or more tracking reference signals (TRSs), or two or more synchronization signal blocks (SSBs).

In some examples of the method, apparatuses, and non-transitory computer-readable medium described herein, receiving the SRS resource configuration indicating the at least one SRS resource may include operations, features, means, or instructions for receiving an indication of one SRS resource, where transmitting the one or more SRSs over the at least one SRS resource may include operations, features, means, or instructions for transmitting the one or more SRSs to each of the two or more TRPs over the one SRS resource.

In some examples of the method, apparatuses, and non-transitory computer-readable medium described herein, the first multi-TRP communication scheme includes an SFN communication scheme or an SDM communication scheme.

In some examples of the method, apparatuses, and non-transitory computer-readable medium described herein, receiving the SRS resource configuration indicating the at least one SRS resource may include operations, features, means, or instructions for receiving an indication of multiple SRS resources, where transmitting the one or more SRSs over the at least one SRS resource may include operations, features, means, or instructions for transmitting an SRS over each of the multiple SRS resources to a different one of the two or more TRPs.

In some examples of the method, apparatuses, and non-transitory computer-readable medium described herein, the first multi-TRP communication scheme includes a TDM communication scheme or an FDM communication scheme.

In some examples of the method, apparatuses, and non-transitory computer-readable medium described herein, receiving the SRS resource configuration indicating the at least one SRS resource may include operations, features, means, or instructions for receiving an SRS resource set configuration associated with an SRS resource set including a plurality of SRS resources, the plurality of SRS resources including the at least one SRS resource.

In some examples of the method, apparatuses, and non-transitory computer-readable medium described herein, receiving the SRS resource configuration indicating the at least one SRS resource may include operations, features, means, or instructions for receiving an indication of an association between each of the at least one SRS resource and one or more antenna panels of the UE and receiving an indication of an antenna panel switching pattern for changing the association between each of the at least one SRS resource and the one or more antenna panels of the UE over time.

Some examples of the method, apparatuses, and non-transitory computer-readable medium described herein may further include operations, features, means, or instructions for receiving DCI scheduling the downlink transmission, the DCI including information associated with a downlink reception beam to be used by the UE and selecting the downlink reception beam based at least in part on the information associated with the downlink reception beam included in the DCI, wherein receiving the downlink transmission may be based at least in part on receiving the DCI and selecting the downlink reception beam.

In some examples of the method, apparatuses, and non-transitory computer-readable medium described herein, receiving the DCI scheduling the downlink transmission may include operations, features, means, or instructions for receiving a TCI codepoint associated with two or more downlink reference signals that may be associated with the at least one SRS resource, wherein selecting the downlink reception beam may be based at least in part on the TCI codepoint.

In some examples of the method, apparatuses, and non-transitory computer-readable medium described herein, receiving the DCI scheduling the downlink transmission may include operations, features, means, or instructions for receiving an SRS resource indicator or a TCI state associated with the at least one SRS resource, wherein selecting the downlink reception beam may be based at least in part on the SRS resource indicator or the TCI state.

In some examples of the method, apparatuses, and non-transitory computer-readable medium described herein, the downlink transmission includes a multi-TRP demodulation reference signal (DMRS).

In some examples of the method, apparatuses, and non-transitory computer-readable medium described herein, transmitting the one or more SRSs over the at least one SRS resource may include operations, features, means, or instructions for transmitting a first SRS to a first TRP of the two or more TRPs using a first transmit beam and a first antenna panel of the UE and a second SRS to a second TRP of the two or more TRPs using a second transmit beam and a second antenna panel of the UE simultaneously.

In some examples of the method, apparatuses, and non-transitory computer-readable medium described herein, transmitting the one or more SRSs over the at least one SRS resource may include operations, features, means, or instructions for transmitting one SRS to one of the two or more TRPs using a transmit beam and an antenna panel of the UE.

In some examples of the method, apparatuses, and non-transitory computer-readable medium described herein, receiving the downlink transmission from the at least one of the two or more TRPs may include operations, features, means, or instructions for receiving the downlink transmission from each of the two or more TRPs according to a second multi-TRP communication scheme based at least in part on the one or more SRSs.

In some examples of the method, apparatuses, and non-transitory computer-readable medium described herein, the first multi-TRP communication scheme and the second multi-TRP communication scheme comprise a TDM communication scheme, an FDM communication scheme, an SDM communication scheme, an SFN communication scheme, or any combination thereof.

In some examples of the method, apparatuses, and non-transitory computer-readable medium described herein, receiving the downlink transmission from the at least one of the two or more TRPs may include operations, features, means, or instructions for receiving the downlink transmission from one of the two or more TRPs according to a single-TRP communication scheme based at least in part on the one or more SRSs.

In some examples of the method, apparatuses, and non-transitory computer-readable medium described herein, the downlink transmission may be associated with a downlink precoding, a rank, or a modulation and coding scheme (MCS) that may be based at least in part on the one or more SRSs.

In some examples of the method, apparatuses, and non-transitory computer-readable medium described herein, the SRS resource configuration may be part of an SRS-based multi-TRP downlink precoding procedure in which the UE receives the downlink transmission associated with the downlink precoding based at least in part on transmitting the one or more SRSs to the two or more TRPs.

A method for wireless communication at a first TRP is described. The method may include transmitting, to a UE, an SRS resource configuration indicating at least one SRS resource, the SRS resource configuration based at least in part on a first multi-TRP communication scheme applied by the first TRP and a second TRP, receiving, from the UE, an SRS over an SRS resource of the at least one SRS resource according to the SRS resource configuration, measuring a channel quality associated with a downlink channel between the first TRP and the UE based at least in part on the SRS, and transmitting, to the UE, a downlink transmission using a downlink precoding, the downlink precoding based at least in part on the channel quality.

An apparatus for wireless communication at a first TRP is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit, to a UE, an SRS resource configuration indicating at least one SRS resource, the SRS resource configuration based at least in part on a first multi-TRP communication scheme applied by the first TRP and a second TRP, receive, from the UE, an SRS over an SRS resource of the at least one SRS resource according to the SRS resource configuration, measure a channel quality associated with a downlink channel between the first TRP and the UE based at least in part on the SRS, and transmit, to the UE, a downlink transmission using a downlink precoding, the downlink precoding based at least in part on the channel quality.

Another apparatus for wireless communication at a first TRP is described. The apparatus may include means for transmitting, to a UE, an SRS resource configuration indicating at least one SRS resource, the SRS resource configuration based at least in part on a first multi-TRP communication scheme applied by the first TRP and a second TRP, means for receiving, from the UE, an SRS over an SRS resource of the at least one SRS resource according to the SRS resource configuration, means for measuring a channel quality associated with a downlink channel between the first TRP and the UE based at least in part on the SRS, and means for transmitting, to the UE, a downlink transmission using a downlink precoding, the downlink precoding based at least in part on the channel quality.

A non-transitory computer-readable medium storing code for wireless communication at a first TRP is described. The code may include instructions executable by at least one processor to transmit, to a UE, an SRS resource configuration indicating at least one SRS resource, the SRS resource configuration based at least in part on a first multi-TRP communication scheme applied by the first TRP and a second TRP, receive, from the UE, an SRS over an SRS resource of the at least one SRS resource according to the SRS resource configuration, measure a channel quality associated with a downlink channel between the first TRP and the UE based at least in part on the SRS, and transmit, to the UE, a downlink transmission using a downlink precoding, the downlink precoding based at least in part on the channel quality.

Some examples of the method, apparatuses, and non-transitory computer-readable medium described herein may further include operations, features, means, or instructions for determining a CSI associated with the downlink channel between the first TRP and the UE based at least in part on the channel quality and determining the downlink precoding based at least in part on the CSI, wherein transmitting the downlink transmission using the downlink precoding may be based at least in part on determining the downlink precoding.

In some examples of the method, apparatuses, and non-transitory computer-readable medium described herein, transmitting the downlink transmission may include operations, features, means, or instructions for transmitting the downlink transmission according to a second multi-TRP scheme based at least in part on the CSI.

In some examples of the method, apparatuses, and non-transitory computer-readable medium described herein, the first multi-TRP communication scheme and the second multi-TRP communication scheme comprise a TDM communication scheme, an FDM communication scheme, an SDM communication scheme, an SFN communication scheme, or any combination thereof.

In some examples of the method, apparatuses, and non-transitory computer-readable medium described herein, transmitting the downlink transmission may include operations, features, means, or instructions for transmitting the downlink transmission according to a single-TRP scheme based at least in part on the CSI.

Some examples of the method, apparatuses, and non-transitory computer-readable medium described herein may further include operations, features, means, or instructions for transmitting, to the UE, a configuration associating the at least one SRS resource with two or more downlink reference signals, the two or more downlink reference signals including a first downlink reference signal from the first TRP and a second downlink reference signal from the second TRP.

In some examples of the method, apparatuses, and non-transitory computer-readable medium described herein, transmitting the configuration associating the at least one SRS resource with the two or more downlink reference signals may include operations, features, means, or instructions for transmitting an indication of a spatial relation between the at least one SRS resource and the two or more downlink reference signals.

In some examples of the method, apparatuses, and non-transitory computer-readable medium described herein, transmitting the configuration associating the at least one SRS resource with the two or more downlink reference signals may include operations, features, means, or instructions for transmitting an indication, for the at least one SRS resource, of an uplink TCI state associated with the two or more downlink reference signals.

In some examples of the method, apparatuses, and non-transitory computer-readable medium described herein, the two or more downlink reference signals comprise two or more CSI-RSs, two or more TRSs, or two or more SSBs.

In some examples of the method, apparatuses, and non-transitory computer-readable medium described herein, transmitting the SRS resource configuration indicating the at least one SRS resource may include operations, features, means, or instructions for transmitting an indication of one SRS resource, the one SRS resource assigned for an SRS transmission to the first TRP and the second TRP, where receiving the SRS over the SRS resource of the at least one SRS resource may include operations, features, means, or instructions for receiving the SRS over the one SRS resource.

In some examples of the method, apparatuses, and non-transitory computer-readable medium described herein, the first multi-TRP communication scheme includes an SFN communication scheme or an SDM communication scheme.

In some examples of the method, apparatuses, and non-transitory computer-readable medium described herein, transmitting the SRS resource configuration indicating the at least one SRS resource may include operations, features, means, or instructions for transmitting an indication of multiple SRS resources including a first SRS resource and a second SRS resource, the first SRS resource assigned for a first SRS transmission to the first TRP and the second SRS resource assigned for a second SRS transmission to the second TRP, where receiving the SRS over the SRS resource of the at least one SRS resource may include operations, features, means, or instructions for receiving the SRS over the first SRS resource assigned for the first SRS transmission to the first TRP.

In some examples of the method, apparatuses, and non-transitory computer-readable medium described herein, the first multi-TRP communication scheme includes a TDM communication scheme or an FDM communication scheme.

In some examples of the method, apparatuses, and non-transitory computer-readable medium described herein, transmitting the SRS resource configuration indicating the at least one SRS resource may include operations, features, means, or instructions for transmitting an SRS resource set configuration associated with an SRS resource set including a plurality of SRS resources, the plurality of SRS resources including the at least one SRS resource.

In some examples of the method, apparatuses, and non-transitory computer-readable medium described herein, transmitting the SRS resource configuration indicating the at least one SRS resource may include operations, features, means, or instructions for transmitting an indication of an association between each of the at least one SRS resource and one or more antenna panels of the UE and transmitting an indication of an antenna panel switching pattern for changing the association between each of the at least one SRS resource and the one or more antenna panels of the UE over time.

Some examples of the method, apparatuses, and non-transitory computer-readable medium described herein may further include operations, features, means, or instructions for transmitting DCI scheduling the downlink transmission, the DCI including information associated with a downlink reception beam to be used by the UE for receiving the downlink transmission.

In some examples of the method, apparatuses, and non-transitory computer-readable medium described herein, transmitting the DCI scheduling the downlink transmission may include operations, features, means, or instructions for transmitting a TCI codepoint associated with two or more downlink reference signals that may be associated with the at least one SRS resource, wherein the information associated with the downlink reception beam includes the TCI codepoint.

In some examples of the method, apparatuses, and non-transitory computer-readable medium described herein, transmitting the DCI scheduling the downlink transmission may include operations, features, means, or instructions for transmitting an SRS resource indicator or a TCI state associated with the at least one SRS resource, wherein the information associated with the downlink reception beam includes the SRS resource indicator or the TCI state.

In some examples of the method, apparatuses, and non-transitory computer-readable medium described herein, the downlink transmission includes a multi-TRP DMRS.

In some examples of the method, apparatuses, and non-transitory computer-readable medium described herein, the SRS resource configuration may be part of an SRS-based multi-TRP downlink precoding procedure in which the first TRP transmits the downlink transmission using the downlink precoding based at least in part on receiving the SRS from the UE.

DETAILED DESCRIPTION

Figure 1:
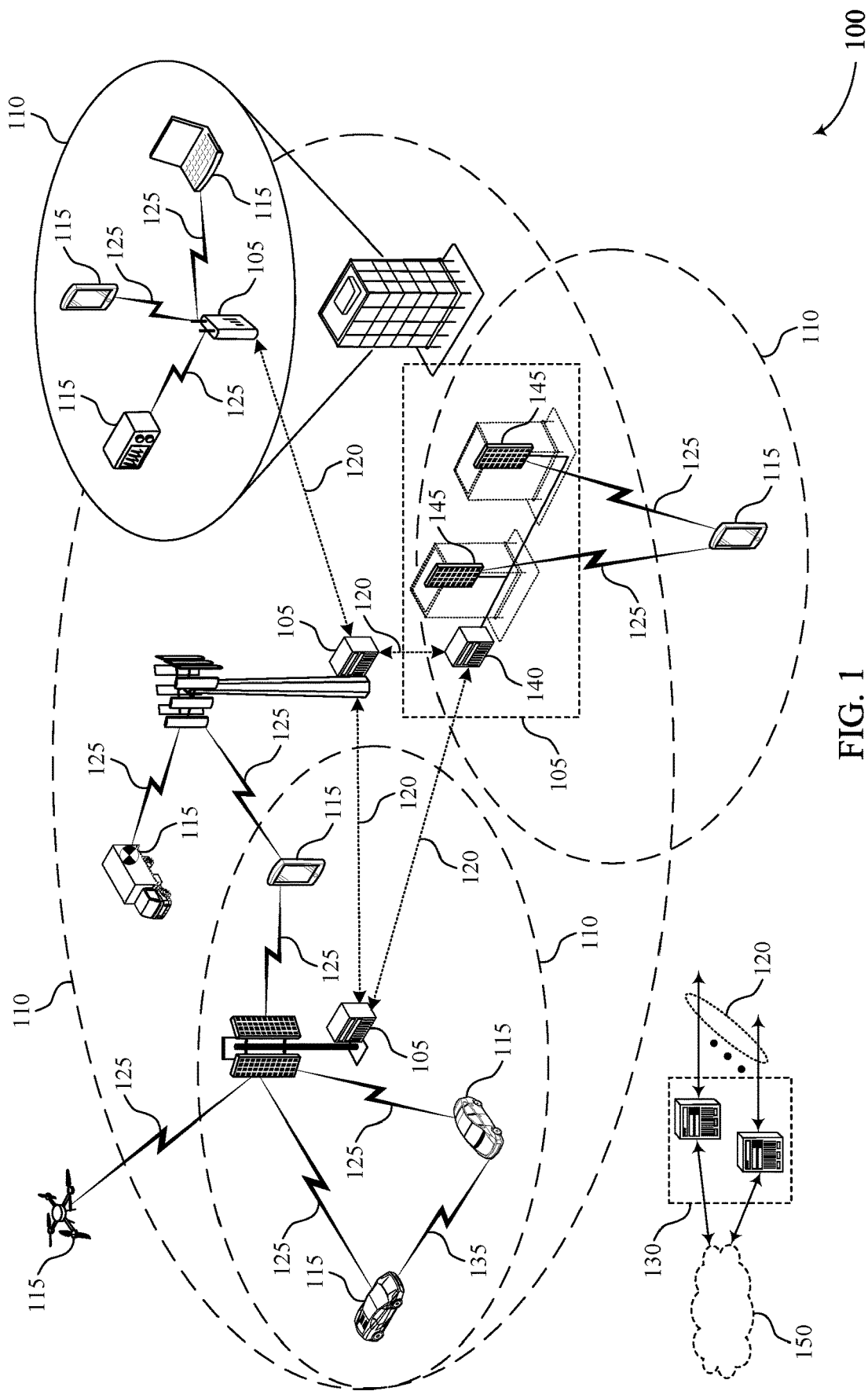
FIG. 1 illustrates an example of a wireless communications system that supports techniques for deriving a sounding reference signal (SRS)-based multi-transmission and reception point (TRP) downlink precoding in accordance with aspects of the present disclosure.

In some wireless communications systems, a user equipment (UE) may receive a coordinated transmission of downlink data from multiple transmission and reception points (TRPs) according to a multi-TRP communication scheme. Such a multi-TRP communication scheme may use a time-division multiplexing (TDM) communication scheme, a frequency-division multiplexing (FDM) communication scheme, a space-division multiplexing (SDM) communication scheme, or a single-frequency network (SFN) communication scheme to allow the UE to receive data from the multiple TRPs. In some cases, the UE receiving the downlink data via the coordinated transmission from the multiple TRPs may experience greater macro or space diversity gain or greater frequency diversity gain based on receiving the downlink data according to a multi-TRP communication scheme, which may increase the likelihood of the UE to successfully receive and decode the downlink data. Such macro diversity or frequency diversity gain may be suitable for some deployment scenarios, such as in scenarios in which the UE is in a state of high mobility. For example, the multiple TRPs to which the UE may communicate may increase the likelihood of the UE to successfully receive downlink data in scenarios in which the UE is in a state of high mobility if the multiple TRPs coordinate transmissions to the UE by applying an SFN communication scheme.

In some cases, however, a quantity of channel state information (CSI) hypotheses the UE may measure may increase in proportion to a quantity of the multiple TRPs from which the UE may receive coordinated transmissions, which may result in increased measurement overhead and reporting latency. Such increased reporting latency may result in sub-optimal, partial, or inaccurate CSI reporting. For example, in scenarios in which the UE is in a high mobility state in which channel conditions between the UE and the multiple TRPs may change rapidly, timely CSI measurement and reporting may be challenging due to a relatively short dwell time for the UE on a beam and due to the increased quantity of CSI hypotheses the UE may measure and report. In other words, the UE may be unable to receive one or more downlink reference signals, measure and report CSI for the quantity of CSI hypotheses present within the multi-TRP communications system, and receive a downlink transmission from the multiple TRPs during a beam dwell time in scenarios in which the UE is in a high mobility state.

In some implementations of the present disclosure, the UE may receive a resource configuration indicating one or more resources over which the UE may transmit a sounding reference signal (SRS) to one or more of the multiple TRPs from which the UE may receive a coordinated downlink transmission. As such, the resource configuration may be referred to herein as an SRS resource configuration. The UE may receive the SRS resource configuration from one of the multiple TRPs or from a serving base station, and the SRS resource configuration may be based on a type of multi-TRP communication scheme applied by the multiple TRPs. For instance, in examples in which the multiple TRPs apply an SFN communication scheme or an SDM communication scheme, the SRS resource configuration may indicate one resource or one resource set over which the UE may transmit SRSs to each if not all of the multiple TRPs simultaneously. Alternatively, in examples in which the multiple TRPs apply a TDM communication scheme or an FDM communication scheme, the SRS resource configuration may indicate multiple resources or multiple resource sets such that the UE may transmit an SRS to each if not all of the multiple TRPs over a different resource or resource set.

The TRPs receiving an SRS from the UE may measure a channel quality between the UE and the TRP and derive downlink CSI based on the measured channel quality. The TRPs, based on deriving the downlink CSI, may determine a downlink precoding to use for transmitting a downlink transmission to the UE. For example, the TRPs receiving the SRS may determine a downlink precoding for each TRP of the multiple TRPs that may transmit to the UE. In some implementations, the TRPs receiving the SRS may determine a multi-TRP communication scheme to apply for transmitting the downlink transmission to the UE based on the derived downlink CSI. Accordingly, one or more of the multiple TRPs (e.g., the TRPs involved with the determined multi-TRP communication scheme) may transmit the downlink transmission to the UE using the downlink precoding.

Particular aspects of the subject matter described in this disclosure can be implemented to realize one or more of the following potential advantages. The described techniques may be implemented to reduce the latency for CSI acquisition based on employing SRS-based CSI acquisition in multi-TRP systems. For example, based on implementing the described techniques, multiple TRPs may obtain downlink CSI based on receiving one or more SRSs from a UE over one or more SRS resources that are configured based on the multi-TRP communication scheme applied by the multiple TRPs, and such SRS-based CSI acquisition within a multi-TRP system may be associated with lower latency than CSI measuring and reporting from the UE (which may be based on receiving one or more downlink reference signals and measuring the downlink reference signals according to a quantity of CSI hypotheses, which is in turn based on a quantity of the multiple TRPs from which the UE may receive a downlink transmission). As such, the multiple TRPs may determine accurate CSI within relatively shorter timelines, which may support complete channel knowledge and appropriate downlink precoding of downlink transmissions in examples in which the UE is in a high mobility state.

Aspects of the disclosure are initially described in the context of wireless communications systems. Aspects of the disclosure are additionally described in the context of a resource association, multi-TRP communication schemes, and a process flow. Aspects of the disclosure are further illustrated by and described with reference to apparatus diagrams, system diagrams, and flowcharts that relate to techniques for deriving a sounding reference signal-based multi-transmission and reception point downlink precoding.

FIG. 1 illustrates an example of a wireless communications system 100 that supports techniques for deriving a sounding reference signal-based multi-transmission and reception point downlink precoding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105

(e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may communicate over a communication link 125 and, in some cases, the UE 115 may perform one or more channel measurements of the communication link 125 between the UE 115 and the base station 105 to determine a channel quality associated with the communication link 125. In some examples, the base station 105 may configure a set of CSI measurement resources, such as CSI-RS resources, and the UE 115 may perform the one or more channel measurements over one or more of the configured set of CSI measurement resources to determine the channel quality associated with the communication link 125. For example, the base station 105 may transmit one or more downlink reference signals, such as CSI-RSs, over one or more CSI measurement resources and the UE 115 may measure the one or more downlink reference signals to determine the channel quality associated with the communication link 125. The UE 115 may generate a CSI report based on the measured channel quality. In some cases, the UE 115 may communicate with multiple TRPs (which may be examples of base stations 105 or relay nodes associated with base stations) and may measure a channel quality associated with each communication link between the UE 115 and the multiple TRPs.

For example, the UE 115 may receive coordinated transmissions of downlink data from multiple TRPs in a multi-TRP communications system and the UE 115 may generate a CSI report based on a channel quality associated with a communication link between the UE 115 and the multiple TRPs from which the UE 115 may receive downlink data. The UE 115 may generate the CSI report based on receiving one or more downlink reference signals (such as CSI-RSs, tracking reference signals (TRSs), or synchronization signal blocks (SSBs)) over one or more configured CSI measurement resources from one or more of the multiple TRPs. In some cases, however, the UE 115 may be unaware of which of the multiple TRPs actually transmit a downlink reference signal over the one or more configured CSI measurement resources. As such, the UE 115 may calculate and report CSI for a quantity of CSI hypotheses (e.g., which may correspond to different transmission schemes at the multiple TRPs), the quantity of CSI hypotheses based on a quantity of the multiple TRPs from which the UE 115 may receive downlink data.

Such calculating and reporting of CSI for the quantity of CSI hypotheses may result in larger measurement overhead, increased processing burden, and greater reporting latency at the UE 115. Further, in some scenarios (such as in scenarios in which the UE 115 is in a state of high mobility and experiences relatively short dwell times on a beam as compared to a lower mobility UE 115), such reporting latency may result in the failure of the UE 115 to provide complete or current channel knowledge to the multiple TRPs, which may lead to erroneous downlink precoding or sub-optimal transmission schemes for subsequent downlink transmissions to the UE 115 from the multiple TRPs.

In some implementations of the present disclosure, the UE 115 and the multiple TRPs from which the UE 115 may receive a downlink transmission may support SRS-based CSI acquisition in which the UE 115 may transmit one or more SRSs to one or more of the multiple TRPs such that the TRPs receiving an SRS from the UE 115 may derive the CSI associated with the downlink to the UE 115 (e.g., assuming channel reciprocity). For example, the UE 115 may receive, from a TRP of the multiple TRPs, an SRS resource configuration indicating at least one SRS resource over which the UE 115 may transmit an SRS. In some aspects, the SRS resource configuration may be based on a type of a multi-TRP communication scheme applied by the multiple TRPs. For instance, in examples in which the multiple TRPs apply an SFN communication scheme or an SDM communication scheme, the SRS resource configuration may indicate one resource over which the UE may transmit SRSs to each if not all of the multiple TRPs simultaneously. Alternatively, in examples in which the multiple TRPs apply a TDM communication scheme or an FDM communication scheme, the SRS resource configuration may indicate multiple resources such that the UE may transmit an SRS to each if not all of the multiple TRPs over a different resource.

The UE 115 may transmit one or more SRSs according to the SRS resource configuration and the TRPs receiving an SRS may derive the downlink CSI. The TRPs, based on receiving an SRS from the UE 115, may each determine a downlink precoding, a rank (e.g., a MIMO rank), a channel quality indicator (CQI), or a modulation and coding scheme (MCS) to apply to a downlink transmission to the UE 115. Additionally or alternatively, the TRPs may determine a multi-TRP communication scheme (or a single-TRP communication scheme) to apply to transmit the downlink transmission to the UE 115 (e.g., in examples in which the multiple TRPs transmit the downlink transmission to the UE 115 with coordination).

Figure 2:
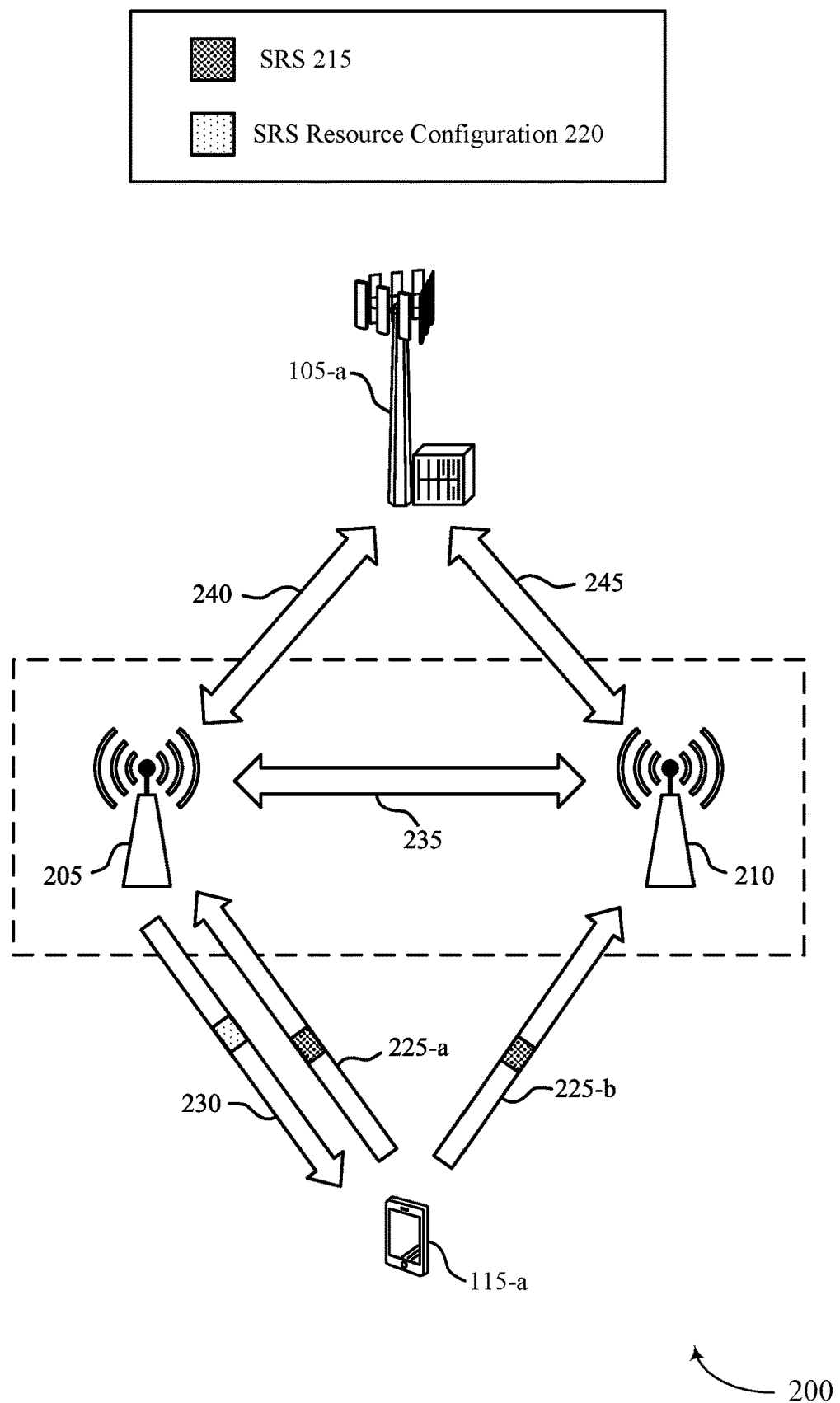
FIG. 2 illustrates an example of a wireless communications system that supports techniques for deriving an SRS-based multi-TRP downlink precoding in accordance with aspects of the present disclosure.

FIG. 2 illustrates an example of a wireless communications system 200 that supports techniques for deriving an SRS-based multi-TRP downlink precoding in accordance with aspects of the present disclosure. In some examples, the wireless communications system 200 may implement aspects of the wireless communications system 100. For example, the wireless communications system 200 may include a UE 115-a, a base station 105-a, a TRP 205, and a TRP 210, which may be examples of corresponding devices described herein, including with reference to FIG. 1. In some examples, the UE 115-a may receive an SRS resource configuration 220 indicating at least one SRS resource, the SRS resource configuration 220 based on a multi-TRP communication scheme applied by the TRP 205 and the TRP 210, and the UE 115-a may transmit one or more SRSs 215 over the at least one SRS resource according to the SRS resource configuration 220 to support SRS-based CSI acquisition within a multi-TRP communications system.

In some cases, the TRP 205 and the TRP 210 may perform joint or coordinated transmissions of downlink data to the UE 115-a over one or more downlink channels according to a multi-TRP communication scheme. For example, the TRP 205 and the TRP 210 may perform a coordinated transmission over a downlink data channel, such as a physical downlink shared channel (PDSCH), according to various multi-TRP communication schemes. The various multi-TRP communication schemes that the TRP 205 and the TRP 210 may apply may include a TDM communication scheme, an FDM communication scheme, an SDM communication scheme, or an SFN communication scheme.

In examples in which the TRP 205 and the TRP 210 apply a TDM communication scheme, the TRP 205 and the TRP 210 may perform coordinated transmissions over different time resources but overlapping frequency resources (such as over different sets of OFDM symbols but over a same set of REs) based on transmitting different sets of time-domain resources (e.g., OFDM symbols, slots, or mini-slots) with different transmission configuration indicator (TCI) states. In examples in which the TRP 205 and the TRP 210 apply an FDM communication scheme, the TRP 205 and the TRP 210 may perform coordinated transmissions over different frequency resources but overlapping time resources (such as over different sets of REs but over a same set of OFDM symbols) based on transmitting different sets of frequency-domain resources (e.g., REs) with different TCI states. Further, in examples in which the TRP 205 and the TRP 210 apply an SDM communication scheme, the TRP 205 and the TRP 210 may perform coordinated transmissions over a same resource (such as over a same set of REs and OFDM symbols) based on transmitting different layers (e.g., spatial layers) with different TCI states. Additional details relating to such multi-TRP communication schemes are described herein, including with reference to FIG. 4.

In examples in which the TRP 205 and the TRP 210 apply an SFN communication scheme, the TRP 205 and the TRP 210 may transmit a same signal simultaneously. In other words, according to an SFN communication scheme, a same signal may be transmitted simultaneously from multiple spatially dispersed TRPs. In such examples, the TRP 205 and the TRP 210 may refrain from applying joint processing of the signal across the two TRPs. For example, the TRP 205 and the TRP 210 may refrain from layer splitting, such as may be performed in examples in which the TRP 205 and the TRP 210 apply an SDM communication scheme, or may refrain from joint precoding, among other examples of joint processing. The UE 115-a, receiving the signal according to the SFN communication scheme, may attain macro diversity (e.g., space diversity) or frequency diversity gain in SFN areas. The TRP 205 and the TRP 210 may apply different types of SFN communication schemes, such as an SFN communication scheme 0, an SFN communication scheme 1, or an SFN communication scheme 2. Additional details relating to such various types of SFN communication schemes are described herein, including with reference to FIG. 5.

In some examples, the TRP 205 and the TRP 210 may employ a beamforming technique in combination with an SFN communication scheme and, in such examples, the same signal may be simultaneously transmitted over multiple beams from the same TRP or from different TRPs. For example, one of the TRP 205 or the TRP 210 may have a multi-beam or multi-panel capability and may transmit the same signal simultaneously using multiple beams. Additionally or alternatively, the TRP 205 and the TRP 210 may simultaneously transmit the signal using different beams from each respective TRP.

In some aspects, single-TRP communication schemes (in which one of the TRP 205 or the TRP 210, and not both, transmits to the UE 115-a) and SFN communication schemes may coexist within the wireless communications system 200. For example, the TRP 205 and the TRP 210 may apply an SFN communication scheme within some areas, in some directions, or via some beams. In other words, SFN communication schemes may be area-specific, direction-specific, or beam-specific. Additionally or alternatively, the TRP 205 and the TRP 210 may apply an SFN communication scheme for some service types. For example, the TRP 205 and the TRP 210 may apply an SFN communication scheme for broadcast or multicast services or traffics and the TRP 205 and the TRP 210 may apply an single-TRP communication scheme (in which case one of the TRP 205 or the TRP 210 may transmit to the UE 115-a) for unicast services or traffics.

Further, the TRP 205 and the TRP 210 may apply an SFN communication scheme for some deployment scenarios, such as in scenarios in which the UE 115-a is in a high mobility state. Such a high mobility state may include scenarios in which the UE 115-a is located on a moving vehicle, such as a high-speed train. In such scenarios in which the UE 115-a is in a high mobility state, such as being on a high-speed train, mobility management procedures may be difficult as the UE 115-a may move between TRPs relatively quickly. As such, instead of managing handovers of the UE 115-a from one TRP to a next TRP (as may be the case in a single-TRP communication scheme), the wireless communications system 200 may support the transmission of the same data over different TRPs (e.g., different cells) across the mobility trajectory of the UE 115-a such that the UE 115-a may receive downlink data in a high mobility state without experiencing frequent handovers.

In some cases, however, the employment of a multi-TRP communication scheme (such as an SFN communication scheme) may increase measurement overhead and result in greater processing burden for CSI calculations at the UE 115-a as compared to a single-TRP communication scheme, which may in turn result in added reporting latency of CSI from the UE 115-a to the TRPs from which the UE 115-a may receive a downlink transmission. For instance, in examples in which the UE 115-a receives downlink transmissions from a single TRP, the UE 115-a may calculate CSI for a single CSI hypothesis (e.g., the CSI hypothesis that a downlink reference signal that the UE 115-a measures for calculating CSI was received from the single TRP). Alternatively, in examples in which the UE 115-a receives downlink transmissions from multiple TRPs (such as the TRP 205 and the TRP 210), the UE 115-a may calculate CSI for multiple CSI hypotheses.

For example, if the UE 115-a may receive a downlink reference signal from the TRP 205 and the TRP 210, the UE 115-a may calculate CSI for three CSI hypotheses including a first CSI hypothesis in which the UE 115-a assumes that the TRP 205 (and not the TRP 210) transmits a downlink reference signal (e.g., via dynamic point selection), a second CSI hypothesis in which the UE 115-a assumes that the TRP 210 (and not the TRP 205) transmits a downlink reference signal (e.g., via dynamic point selection), and a third CSI hypothesis in which the UE 115-a assumes that both the TRP 205 and the TRP 210 transmit downlink reference signals simultaneously (e.g., according to a multi-TRP communication scheme). Further, the third CSI hypothesis may include a number of candidates based on the number of multi-TRP communication schemes that the TRP 205 and the TRP 210 may apply, including a TDM communication scheme, an FDM communication scheme, an SDM communication scheme, or an SFN communication scheme. Likewise, a quantity of the CSI hypotheses for which the UE 115-a may calculate CSI may increase as a quantity of the multiple TRPs from which the UE 115-a may receive a downlink transmission increase. Such increased quantity of CSI hypotheses may account for the increased measurement overhead, greater processing burden, and added reporting latency of CSI at the UE 115-a for multi-TRP communication schemes as compared to single-TRP communication schemes.

Further, in scenarios in which the UE 115-a is in a high mobility state (e.g., on a high-speed train), the channel conditions between the UE 115-a and the TRP 205 and the TRP 210 may change rapidly, which may increase the likelihood that the UE 115-*a* is unable to perform timely CSI measurement and reporting. For instance, in examples in which the UE 115-*a* is on a high-speed train traveling at a speed of approximately 500 km/hour, the dwell time for a beam (e.g., the time on which the UE 115-*a* may be connected to a beam of a TRP) may be approximately 40 ms, which may be an insufficient amount of time for the UE 115-*a* to measure and report CSI based on measuring one or more downlink reference signals and for the TRP 205 or the TRP 210 to schedule and transmit a downlink transmission based on the reported CSI.

As such, in some implementations of the present disclosure, the wireless communications system 200 may support uplink SRS-based CSI acquisition for multi-TRP deployment scenarios, which may reduce the processing burden at the UE 115-*a* associated with multi-TRP CSI acquisition. For example, the UE 115-*a*, the TRP 205, and the TRP 210 may support SRS-based channel sounding and channel reciprocity to derive downlink CSI based on uplink SRSs 215 within a multi-TRP communications system (e.g., in which multiple TRPs may use the downlink CSI to determine downlink precoding or a multi-TRP communication scheme that will increase the likelihood of successful communication with the UE 115-*a*).

To support such SRS-based CSI acquisition within a multi-TRP communications system, the UE 115-*a* may receive an SRS resource configuration 220 over a downlink channel 230 indicating at least one SRS resource or SRS resource set that is configured for the transmission of uplink SRS 215 from the UE 115-*a*. In some examples, the SRS resource configuration may depend on the type of multi-TRP communication scheme applied by the TRP 205 and the TRP 210. For example, the TRP 205 and the TRP 210 may determine (e.g., initially determine) a multi-TRP communication scheme to be used for downlink communication to the UE 115-*a* based on exchanging signaling with each other via a communication link 235 or based on exchanging signaling with a base station 105-*a*, which may function as or be connected to a core network entity, via a communication link 240 and a communication link 245, respectively.

In examples in which the TRP 205 and the TRP 210 determine to apply an SFN communication scheme or an SDM communication scheme, the SRS resource configuration 220 may indicate one SRS resource or one SRS resource set over which the UE 115-*a* may transmit one or more SRSs 215 to multiple TRPs simultaneously. For example, in such examples in which the TRP 205 and the TRP 210 apply an SFN communication scheme or an SDM communication scheme, the UE 115-*a* may be configured to transmit an SRS 215 to each if not both of the TRP 205 and the TRP 210 over one SRS resource or over resources of one SRS resource set. For instance, the UE 115-*a* may transmit a first SRS 215 to the TRP 205 over an uplink channel 225-*a* and may transmit a second SRS 215 to the TRP 210 over an uplink channel 225-*b*, where the uplink channel 225-*a* and the uplink channel 225-*b* may include a same SRS resource or resources of a same SRS resource set (e.g., the uplink channel 225-*a* and the uplink channel 225-*b* may be a same uplink channel 225).

Alternatively, in examples in which the TRP 205 and the TRP 210 determine to apply a TDM communication scheme or an FDM communication scheme, the SRS resource configuration may indicate multiple SRS resources or multiple SRS resource sets over which the UE 115-*a* may transmit one or more SRSs 215 such that the UE 115-*a* may transmit an SRS 215 to each TRP over a different SRS resource or over resources of different SRS resource sets. For example, in such examples in which the TRP 205 and the TRP 210 apply a TDM communication scheme or an FDM communication scheme, the UE 115-*a* may be configured to transmit a first SRS 215 to the TRP 205 over the uplink channel 225-*a* and to transmit a second SRS 215 to the TRP 210 over the uplink channel 225-*b*, where the uplink channel 225-*a* includes a first SRS resource or a resource of a first SRS resource set and the uplink channel 225-*b* includes a second SRS resource or a resource of a second SRS resource set. In some examples, the UE 115-*a* may use multiple antenna arrays or antenna panels in examples in which the UE 115-*a* communicates with the TRP 205 and the TRP 210 in a TDM or an FDM manner and, as such, the UE 115-*a* may switch between the multiple antenna panels of the UE 115-*a* when transmitting the first SRS 215 to the TRP 205 and the second SRS 215 to the TRP 210 in some implementations.

In some examples, the UE 115-*a* may have a smaller quantity of transmit chains (which may be referred to as Tx chains) than a quantity of receive chains (which may be referred to as Rx chains). For example, a higher cost may be associated with operating a transmit chain than operating a receive chain and, as such, the UE 115-*a* may operate fewer transmit chains than receive chains to keep operating costs low at the UE 115-*a*. In such examples in which the UE 115-*a* has fewer transmit chains than receive chains (and also in examples in which the UE 115-*a* has an equal or greater number of transmit chains than receive chains), the SRS resource configuration 220 may configure each SRS resource with an associated antenna element or panel, and may configure each SRS resource with an antenna panel switching pattern (e.g., a transmit antenna element or panel switching pattern).

For instance, in examples in which the SRS resource configuration indicates one SRS resource, the SRS resource configuration 220 may configure the UE 115-*a* to use a first antenna panel of the UE 115-*a* to transmit an SRS 215 over the one SRS resource to the TRP 205 during a first time interval and the antenna panel switching pattern may configure the UE 115-*a* to switch to using a second antenna panel of the UE 115-*a* to transmit an SRS 215 over the one SRS resource to the TRP 210 during a second time interval (where the one SRS resource refers to a frequency resource or a channel band). Similarly, extending to examples in which the SRS resource configuration 220 indicates multiple SRS resources, the SRS resource configuration 220 may configure the UE 115-*a* to use a first antenna panel of the UE 115-*a* to transmit an SRS 215 over a first SRS resource to the TRP 205 and to use a second antenna panel of the UE 115-*a* to transmit an SRS 215 over a second SRS resource to the TRP 210 during a first time interval (e.g., in examples in which the UE 115-*a* has a multi-panel or a multi-beam capability) and the antenna panel switching pattern may configure the UE 115-*a* to switch to using the second antenna panel to transmit an SRS 215 over the first SRS resource to the TRP 210 and to using the first antenna panel to transmit an SRS 215 over the second SRS resource to the TRP 205 during a second time interval (where the first SRS resource and the second SRS resource refer to different frequency resources or different channel bands).

In some implementations, the UE 115-*a* may receive a configuration (e.g., as part of or in addition to the SRS resource configuration 220) associating each of the one or more SRS resources indicated by the SRS resource configuration 220 with two or more downlink reference signals. In some aspects, each of the two or more downlink reference signals may be from a different TRP. For example, the configuration associating each of the one or more SRS resources with the two or more downlink reference signals may associate an SRS resource with a first downlink reference signal from the TRP 205 and a second downlink reference signal from the TRP 210. In some examples, the association may be via a quasi-colocation (QCL) or a spatial relation configuration. Alternatively, the association may be via an uplink TCI state (which may be different than a downlink TCI state). Additional details relating to the association of an SRS resource with two or more downlink reference signals are described herein, including with reference to FIG. 3.

In some examples, the UE 115-*a*, based on receiving the configuration associating the two or more downlink reference signals with an SRS resource, may select a transmit beam to use for transmitting an SRS 215 over the SRS resource based on the indicated two or more downlink reference signals (e.g., based on receiving the indicated QCL or spatial relation configuration as an SRS beam indication for multi-TRP channel sounding). Additionally or alternatively, the UE 115-*a* may select a transmit beam to use for transmitting an SRS 215 over the SRS resource based on a UE decision or capability (e.g., based on UE implementation). For instance, in examples in which the UE 115-*a* has a multi-panel or a multi-beam capability, the UE 115-*a* may use beams that are reachable to the TRP 205 and the TRP 210. For example, the UE 115-*a* may operate multiple antenna panels including a first antenna panel and a second antenna panel and the UE 115-*a* may transmit a first SRS 215 to the TRP 205 using a first transmit beam from the first antenna panel and may transmit a second SRS 215 to the TRP 210 using a second transmit beam from the second antenna panel. In some aspects, the UE 115-*a* may transmit the first SRS 215 to the TRP 205 using the first transmit beam and the second SRS 215 to the TRP 210 using the second transmit beam simultaneously, such as over a same SRS resource that may be indicated by the SRS resource configuration 220 (e.g., in examples in which the TRP 205 and the TRP 210 apply an SFN communication scheme or an SDM communication scheme).

Alternatively, in examples in which the UE 115-*a* has a single-panel or a single-beam capability (or otherwise determines to use one antenna panel or one transmit beam for a given SRS resource), the UE 115-*a* may select a TRP (e.g., one of the TRP 205 or the TRP 210) and focus a transmit beam (e.g., an SRS beam) to the selected TRP. In some implementations, the UE 115-*a* may select the TRP based on determining which of the TRP 205 and the TRP 210 has a higher signal strength or channel quality. For example, the UE 115-*a* may select the TRP with a higher reference signal received power (RSRP) and beamform an SRS 215 to the TRP that has the higher RSRP. Further, in examples in which the SRS resource configuration 220 indicates multiple resources over which the UE 115-*a* may transmit an SRS 215, each SRS resource assigned for an SRS 215 transmission to a different TRP (as may be the case in examples in which the TRP 205 and the TRP 210 apply a TDM communication scheme or an FDM communication scheme), the UE 115-*a* may use a single transmit beam to focus an SRS 215 to each of the multiple TRPs over the separately assigned SRS resources. For example, the UE 115-*a* may use a first transmit beam from a first antenna panel to transmit a first SRS 215 to the TRP 205 over a first SRS resource and may use a second transmit beam from the first antenna panel to transmit a second SRS 215 to the TRP 210 over a second SRS resource.

Accordingly, one or both of the TRP 205 or the TRP 210 may receive an SRS 215 from the UE 115-*a* (e.g., based on the SRS resource configuration 220 or the beam capability of the UE 115-*a*, or both) and the TRP or TRPs that receive an SRS 215 from the UE 115-*a* may derive a downlink CSI associated with a downlink channel to the UE 115-*a*. In some examples, the TRP 205 and the TRP 210 may both receive an SRS 215 from the UE 115-*a* and both of the TRP 205 and the TRP 210 may derive a downlink CSI associated with the uplink channel 225-*a* and the uplink channel 225-*b*, respectively, (e.g., assuming channel reciprocity between an uplink channel 225 and a corresponding downlink channel) over which the UE 115-*a* transmits the SRSs 215. The TRP 205 and the TRP 210, based on deriving respective downlink CSI, may each determine a downlink precoding to be used when transmitting a downlink transmission (e.g., downlink data) to the UE 115-*a*. Additionally or alternatively, the TRP 205 and the TRP 210 may each determine a rank indicator (RI), a CQI, or an MCS, or any combination thereof, based on deriving their respective downlink CSI.

Additionally or alternatively, the TRPs receiving an SRS 215 (e.g., the TRP 205 or the TRP 210, or both) may determine to use a multi-TRP communication scheme or a single-TPR communication scheme for the downlink transmission to the UE 115-*a* based on the derived downlink CSI. For example, based on the derived downlink CSI, the TRPs receiving an SRS 215 may determine whether to apply a TDM communication scheme, an FDM communication scheme, an SDM communication scheme, an SFN communication scheme, or a single-TRP communication scheme for transmitting the downlink transmission to the UE 115-*a*. In examples in which the TRP 205 and the TRP 210 determine to apply a multi-TRP communication scheme based on the derived downlink CSI, the TRP 205 and the TRP 210 may perform a coordinated transmission of the downlink transmission to the UE 115-*a* based on applying the multi-TRP communication scheme. In some aspects, one of the TRP 205, the TRP 210, or the base station 105-*a* may make the determination to apply the multi-TRP communication scheme and the one of the TRP 205, the TRP 210, or the base station 105-*a* may signal the determined multi-TRP communication scheme to the others of the TRP 205, the TRP 210, and the base station 105-*a* (e.g., the other devices that are involved in the multi-TRP communication scheme).

The TRP 205, the TRP 210, or the base station 105-*a*, based on determining either or both of a downlink precoding or a communication scheme (e.g., a multi-TRP or a single-TRP communication scheme), may transmit control signaling, such as downlink control information (DCI), to the UE 115-*a* to schedule the downlink transmission to the UE 115-*a*. In some implementations, the TRP 205, the TRP 210, or the base station 105-*a* may schedule the downlink transmission based on the derived CSI. Additional detail relating to such selection of a downlink receive beam are described herein, including with reference to FIG. 3.

As such, the TRP 205 or the TRP 210, or both, may transmit the downlink transmission to the UE 115-*a* with a downlink precoding or by applying a communication scheme, or both, based on an SRS-based downlink CSI derivation. Such downlink CSI acquisition via uplink channel sounding within a multi-TRP communications system may simplify CSI calculations or measurements at the UE 115-*a* and reduce latency of the CSI acquisition by the serving TRPs, which may enable the serving TRPs to transmit downlink data to the UE 115-*a* with appropriate precoding according to a low latency timeline (such as a timeline that may be suitable for scenarios in which the UE 115-*a* is in a high mobility state and has a relatively short beam dwell time).

Figure 3:
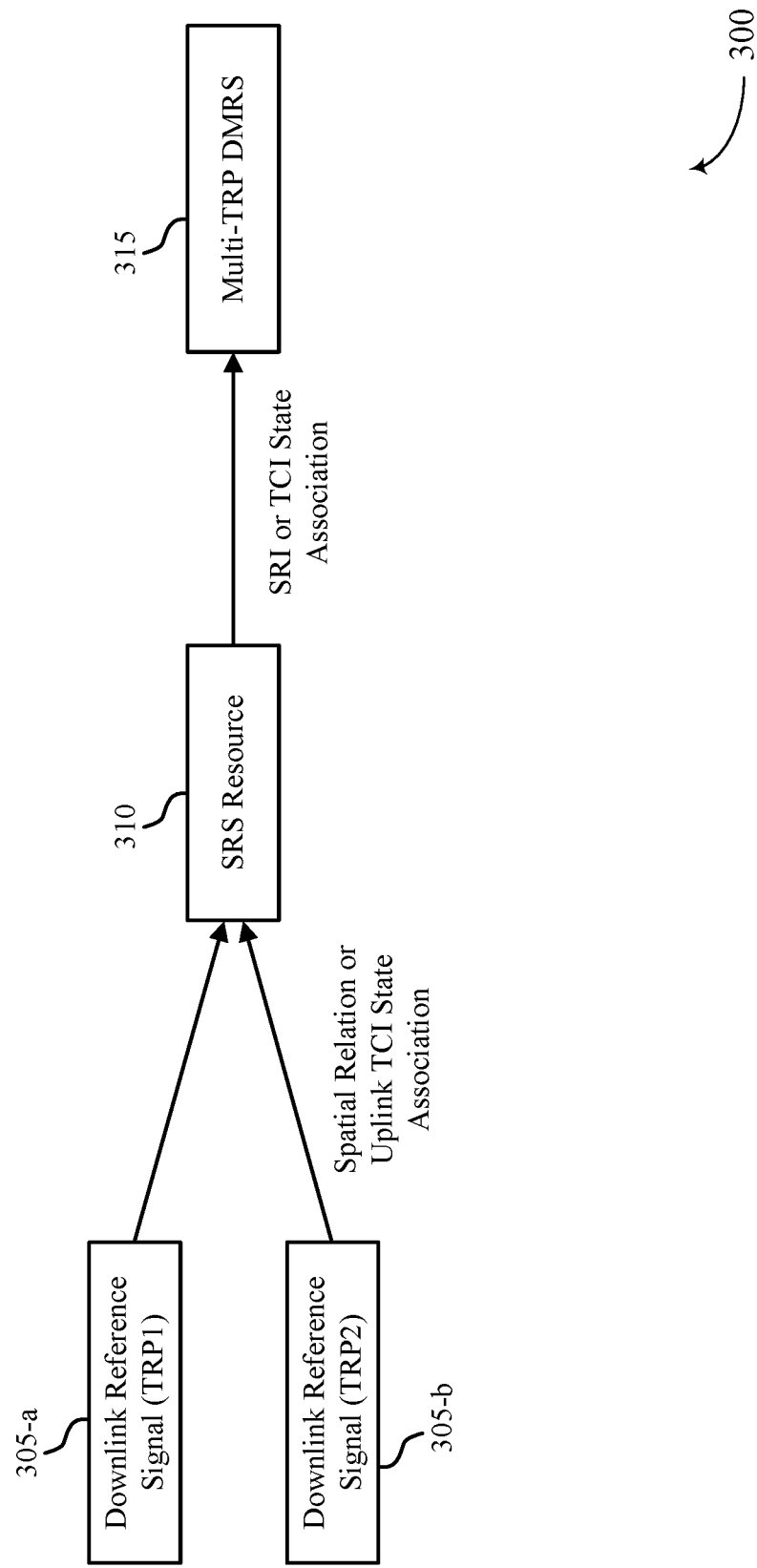
FIG. 3 illustrates an example of a resource association that supports techniques for deriving an SRS-based multi-TRP downlink precoding in accordance with aspects of the present disclosure.

FIG. 3 illustrates an example of a resource association 300 that supports techniques for deriving an SRS-based multi-TRP downlink precoding in accordance with aspects of the present disclosure. In some examples, the resource association 300 may be implemented to realize aspects of the wireless communications system 100 or the wireless communications system 200. For example, a UE 115 may receive an SRS resource configuration indicating one or more SRS resources 310 over which the UE 115 may transmit an SRS to one or more TRPs within a multi-TRP communications system and the UE 115 may receive one or more configurations indicating an association between an SRS resource 310, two or more downlink reference signals 305, and a multi-TRP demodulation reference signal (DMRS) 315 (e.g., a DMRS transmitted according to a multi-TRP communication scheme).

In some examples, the UE 115 may receive a configuration associating an SRS resource 310 indicated by the SRS resource configuration with two or more downlink reference signals 305 (or two or more downlink reference signal resources), and the configuration associating the SRS resource 310 with the two or more downlink reference signals 305 may be received as part of or in addition to the SRS resource configuration. In some aspects, each of the two or more downlink reference signals 305 may be from a different TRP of the multiple TRPs from which the UE 115 may receive downlink communication. For example, the configuration may associate the SRS resource 310 with two downlink reference signals 305 including a downlink reference signal 305-*a* from a first TRP (e.g., a TRP1) and a downlink reference signal 305-*b* from a second TRP (e.g., a TRP2). In such examples, the association between the SRS resource 310 and the two or more downlink reference signals 305 may be via a QCL or spatial relation configuration or via an uplink TCI state.

In examples in which the association between the SRS resource 310 and the two or more downlink reference signals 305 is a QCL or spatial relation association, the configuration may include an SRS-SpatialRelationInfo information element that includes the two or more downlink reference signals 305. For example, the SRS-SpatialRelationInfo information element may include the downlink reference signal 305-*a* from the TRP1 and the downlink reference signal 305-*b* from the TRP2. Alternatively, in examples in which the association between the SRS resource 310 and the two or more downlink reference signals 305 is via an uplink TCI state association, the configuration may indicate an uplink TCI state that is associated with the two or more downlink reference signals 305 as QCL source reference signals. The configuration (which may associate the SRS resource 310 with the two or more downlink reference signals 305 via a spatial relation or an uplink TCI state association) may function as an SRS beam indication for multi-TRP channel sounding. In some examples, the UE 115 may determine one or more transmit beams to use for transmitting one or more SRSs over the SRS resource 310 such that the one or more SRSs are focused towards one or more of the multiple TRPs from which the UE 115 may receive downlink communication. In some additional or alternative examples, the UE 115 may determine one or more transmit beams to use for transmitting one or more SRSs over the SRS resource 310 based on a UE decision or capability (such as a multi-beam or single-beam capability).

In some aspects, the two or more downlink reference signals may include CSI-RSs (or CSI-RS resources), TRSs (or TRS resources), SSBs (or SSB resources), or any combination thereof. Further, such a configuration associating the SRS resource 310 indicated by the SRS resource configuration with the two or more downlink reference signals 305 may be applicable to examples in which the SRS resource configuration indicates one SRS resource 310 (or one SRS resource set) over which the UE may transmit an SRS to multiple TRPs simultaneously and to examples in which the SRS resource configuration indicates multiple SRS resources 310 (or multiple SRS resource sets) such that the UE 115 may transmit an SRS to different TRPs over different SRS resources 310. For instance, in examples in which the SRS resource configuration indicates one SRS resource 310, the UE 115 may determine that the one SRS resource 310 is for multi-TRP channel sounding based on receiving the configuration that the one SRS resource 310 is associated with the downlink reference signal 305-*a* from the TRP1 and the downlink reference signal 305-*b* from the TRP2.

Such a configuration may similarly apply in examples in which the SRS resource configuration indicates multiple SRS resources 310 such that each of the multiple SRS resources 310 are associated with two or more downlink reference signals 305, each from a different TRP. Alternatively, but also in examples in which the SRS resource configuration indicates multiple SRS resources 310, the configuration may associate each indicated SRS resource 310 with a single downlink reference signal 305 from one TRP (such that each indicated SRS resource 310 may be used by the UE 115-*a* to transmit to that associated TRP, and not multiple TRPs). For instance, the configuration may indicate that each SRS resource 310 may be associated with one downlink reference signal from one TRP such that the configuration may function as an SRS beam indication for multi-TRP channel sounding in implementations in which the UE 115 may use a different resource to sound different TRPs.

As described herein, including with reference to FIG. 2, the multiple TRPs receiving an SRS from the UE 115 over an SRS resource 310 may schedule a downlink transmission (e.g., downlink data over a PDSCH) to the UE 115 based on the CSI derived from the SRSs received from the UE 115. In some examples, downlink transmission may be scheduled by one of the multiple TRPs or a serving base station 105, such as a base station 105-*a* as described with reference to FIG. 2, via downlink control signaling, such as DCI. In some implementations, the scheduling DCI may include information associated with a downlink receive beam that the UE 115 is to use to receive the downlink transmission, including a multi-TRP DMRS 315. In other words, for a QCL indication for a DMRS (e.g., the multi-TRP DMRS 315) of the downlink transmission, the scheduling DCI may provide information associated with a downlink receive beam to be used by the UE 115 to receive the downlink transmission (e.g., to receive the multi-TRP DMRS 315 of the downlink transmission). In some aspects, the indication for the multi-TRP DMRS 315 may include a beam indication by a QCL field, such as a QCL-TypeD field.

In some examples, for the QCL indication for the multi-TRP DMRS 315, the scheduling DCI may indicate a TCI codepoint associated with two or more downlink reference signals 305 (e.g., the two or more downlink reference signals 305 associated with an SRS resource 310 over which the UE 115 transmits an SRS) or an SRS resource indicator (SRI) or TCI state associated with a source SRS resource 310 (a QCL source SRS resource 310, such as the SRS resource 310 over which the UE 115 transmits an SRS, having a unified TCI state), and the UE 115 may select a downlink receive beam to use for receiving the downlink transmission based on one or more of such indications. For example, the UE 115 may transmit an SRS over the SRS resource 310 and, based on receiving scheduling DCI indicating an TCI codepoint, an SRI, or a TCI state associated with the SRS resource 310, the UE 115 may determine that the multi-TRP DMRS 315 is associated with the SRS transmission over the SRS resource 310 and also may select a downlink receive beam to use to receive the multi-TRP DMRS 315 and corresponding downlink data accordingly.

Figure 4:
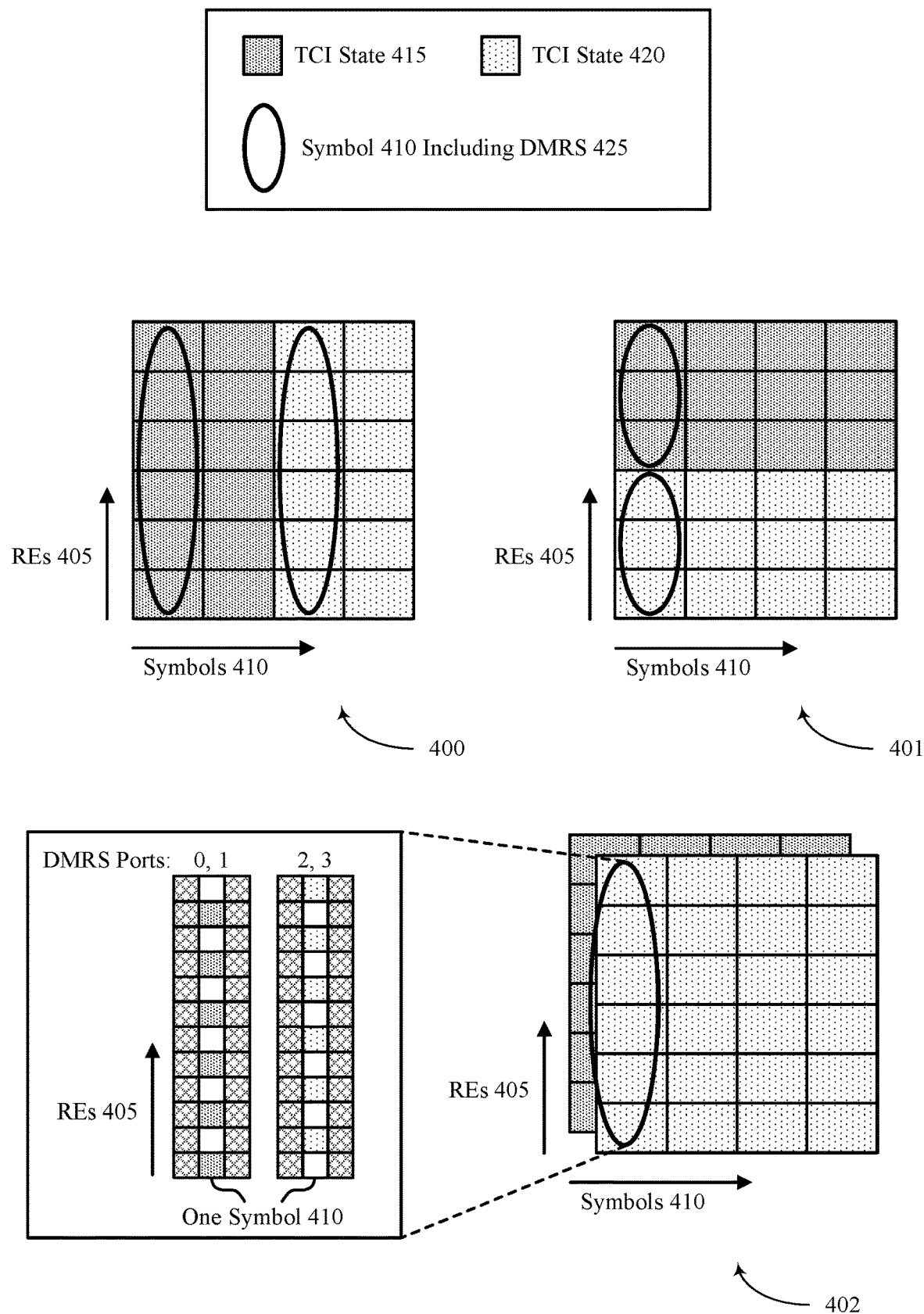
FIG. 4 illustrates example multi-TRP communication schemes that support techniques for deriving an SRS-based multi-TRP downlink precoding in accordance with aspects of the present disclosure.

FIG. 4 illustrates example multi-TRP communication schemes 400, 401, and 402 that support techniques for deriving an SRS-based multi-TRP downlink precoding in accordance with aspects of the present disclosure. In some examples, the multi-TRP communication schemes 400, 401, and 402 may be implemented to realize aspects of the wireless communications system 100 or the wireless communications system 200. For example, multiple TRPs may employ one of the multi-TRP communication schemes 400, 401, and 402 to transmit over a PDSCH to a UE 115 by applying multiple TCI states. For example, the multi-TRP communication schemes 400, 401, and 402 may illustrate joint downlink transmissions to the UE 115 from a first TRP applying a TCI state 415 and from a second TRP applying a TCI state 420.

For example, in a single-DCI based multi-TRP design, a single physical downlink control channel (PDCCH) (e.g., a single NR-PDCCH) may schedule a single PDSCH (e.g., a single NR-PDSCH) and various communication schemes may be applied by the multiple TRPs, such as the multi-TRP communication schemes 400, 401, and 402. In some cases, for example, as shown by the multi-TRP communication scheme 400, the multiple TRPs may apply a TDM communication scheme in which the different TRPs may transmit in different symbols 410 (which may be OFDM symbols) and overlapping REs 405. In such cases, the multiple TRPs may transmit different sets of symbols 410 (e.g., different slots or mini-slots of symbols 410) with different TCI states. For example, the first TRP may transmit a first set of symbols 410 with the TCI state 415 and the second TRP may transmit a second set of symbols 410 with the TCI state 420. In some aspects, the multiple TRPs may transmit different repetitions of the set of symbols 410 within a same slot or in different slots. Further, the first symbol 410 of each set of symbols 410 transmitted by a different TRP (and likewise transmitted according to a different TCI state) may include a DMRS 425, which may be an example of a multi-TRP DMRS 315 as described with reference to FIG. 3.

In some other cases, as shown by the multi-TRP communication scheme 401, the multiple TRPs may apply an FDM communication scheme in which the different TRPs may transmit in different REs 405 during overlapping symbols 410. In such cases, the multiple TRPs may transmit over different sets of REs 405 with different TCI states. For example, the first TRP may transmit over a first set of REs 405 with the TCI state 415 and the second TRP may transmit over a second set of REs 405 with the TCI state 420. The first symbol 410 of each set of REs 405 transmitted by a different TRP (and likewise transmitted according to a different TCI state) may include a DMRS 425 (e.g., the first symbol 410 including the DMRS 425 may be a same symbol for both the first TRP and the second TRP when using FDM communication schemes), which may be an example of a multi-TRP DMRS 315 as described with reference to FIG. 3.

In some other cases, as shown by the multi-TRP communication scheme 402, the multiple TRPs may apply an SDM communication scheme in which the different TRPs may transmit different spatial layers in overlapping REs 405 and symbols 410. In such cases, the multiple TRPs may transmit over different layers with different TCI states. For example, the first TRP may transmit over a first layer with the TCI state 415 and the second TRP may transmit over a second layer with the TCI state 420. The first symbol 410 of each layer transmitted by a different TRP (and likewise transmitted according to a different TCI state) may include a DMRS 425 (e.g., the first symbol 410 including the DMRS 425 may be a same symbol for both the first TRP and the second TRP when using SDM communication schemes), which may be an example of a multi-TRP DMRS 315 as described with reference to FIG. 3.

Further, for the transmission of the DMRS 425 in examples in which the first TRP and the second TRP transmit according to the SDM communication scheme, the REs 405 to which the TRPs may map DMRS ports may be configured according to a frequency hopping pattern such that the DMRS ports associated with a first set of layers transmitted by the first TRP with the TCI state 415 do not occupy the same REs 405 as the DMRS ports associated with a second set of layers transmitted by the second TRP with the TCI state 420. For example, the first TRP may transmit DMRS ports 0, 1 over a first set of REs 405 with the TCI state 415 and the second TRP may transmit DMRS ports 2, 4 over a second set of REs 405 with the TCI state 420 such that the first set of REs 405 and the second set of REs 405 do not occupy the same REs 405.

As shown by the multi-TRP communication scheme 402 (e.g., an SDM communication scheme), the first TRP and the second TRP may transmit over sets of REs 405 and symbols 410. In some cases, an RB may include 12 REs 405 such that, in some aspects, the first TRP and the second TRP may also be understood as transmitting over RBs (or sets of RBs) and symbols 410. In the depicted example, there are four layers and four DMRS ports, where each port corresponds to one layer. In an example, each DMRS port may correspond to one layer, such that the DMRS ports 0, 1 may be associated with the TCI state 415 and correspond to a first two layers and the DMRS ports 2, 4 may be associated with the TCI state 420 correspond to a next two layers. Data layers (unlike DMRS ports) may be mapped to the same REs 405, such that each data RE 405 includes all four layers (e.g., the first two layers and the next two layers).

Figure 5:
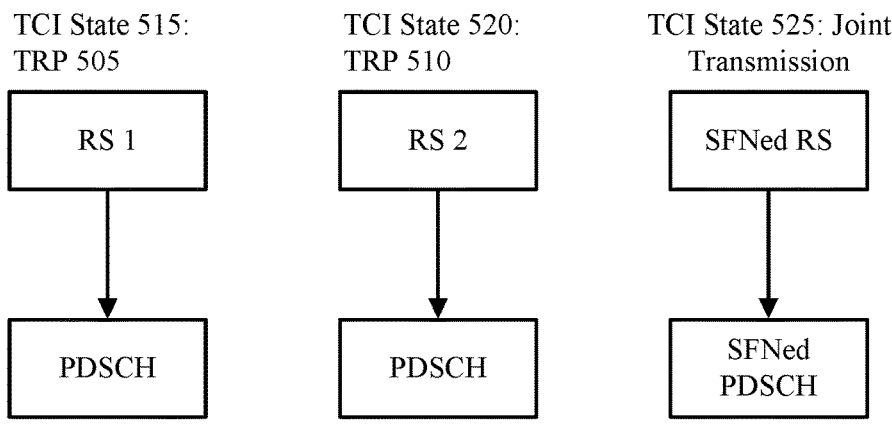
FIG. 5 illustrates example SFN communication schemes that support techniques for deriving an SRS-based multi-TRP downlink precoding in accordance with aspects of the present disclosure.
Figure 5:
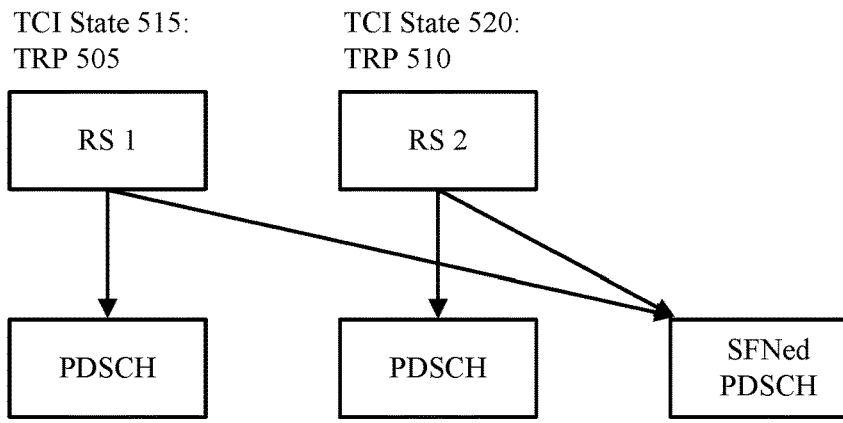
Figure 5:
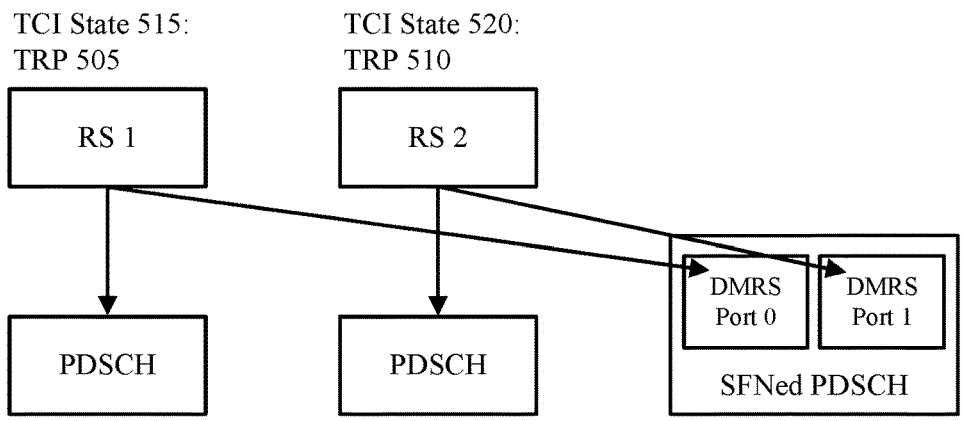

FIG. 5 illustrates example SFN communication schemes 500, 501, and 502 that support techniques for deriving an SRS-based multi-TRP downlink precoding in accordance with aspects of the present disclosure. In some examples, the SFN communication schemes 500, 501, and 502 may be implemented to realize aspects of the wireless communications system 100 or the wireless communications system 200. For example, multiple TRPs may employ one of the SFN communication schemes 500, 501, and 502 to transmit over a PDSCH to a UE 115 by applying multiple TCI states and the UE 115. The SFN communication schemes 500, 501, and 502 may illustrate joint downlink transmissions to the UE 115 from a TRP 505 applying a TCI state 515 and from a TRP 510 applying a TCI state 520.

The SFN communication scheme 500 illustrates an SFN communication scheme 0. In some aspects, the SFN communication 0 may also refer to a transparent SFN communication scheme. In some examples, the TRP 505 and the TRP 510 may each transmit two separate reference signals (e.g., a reference signal 1 (RS 1) and a reference signal 2 (RS 2), respectively) and each separate reference signal may be associated with a different PDSCH. As such, to achieve an "SFNed" PDSCH, the TRP 505 and the TRP 510 may define an additional TCI state, such as a TCI state 525, that may be used to transmit an "SFNed" reference signal associated with an "SFNed" PDSCH. The "SFNed" PDSCH in the SFN communication 0 may include DMRS ports and data layers that are associated with the additional TCI state 525.

The SFN communication scheme 501 illustrates an SFN communication scheme 1. In such an SFN communication scheme 1, the TRP 505 and the TRP 510 may transmit two separate reference signals (e.g., an RS 1 and an RS 2, respectively) and each of the two reference signals may be associated with a different PDSCH and also with a joint "SFNed" PDSCH in which each DMRS port or data layer of the "SFNed" PDSCH is associated with both the TCI state 515 and the TCI state 520. In other words, the TRP 505 and the TRP 510 may transmit reference signals (such as TRSs) in a TRP-specific or non-SFN manner while the associated DMRS and PDCCH or PDSCH from the TRPs are transmitted in an SFN manner.

The SFN communication scheme 502 illustrates an SFN communication scheme 2. In such an SFN communication scheme 2, the TRP 505 and the TRP 510 may transmit two separate reference signals (e.g., an RS 1 and an RS 2, respectively) and each of the two reference signals may be associated with a different PDSCH and also with a joint PDSCH in which each data layer of the joint PDSCH is associated with the TCI state 515 and the TCI state 520 while each DMRS port of the joint PDSCH is associated with either the TCI state 515 or the TCI state 520 (e.g., not both). For example, a DMRS port 0 of the joint PDSCH may be associated with the TCI state 515 (and not with the TCI state 520) and a DMRS port 1 of the joint PDSCH may be associated with the TCI state 520 (and not with the TCI state 515). In other words, the TRP 505 and the TRP 510 may transmit reference signals (such as TRSs) and DMRS in a TRP-specific or non-SFN manner while the associated PDSCH transmission (e.g., data layers) from the TRPs is transmitted in an SFN manner.

Figure 6:
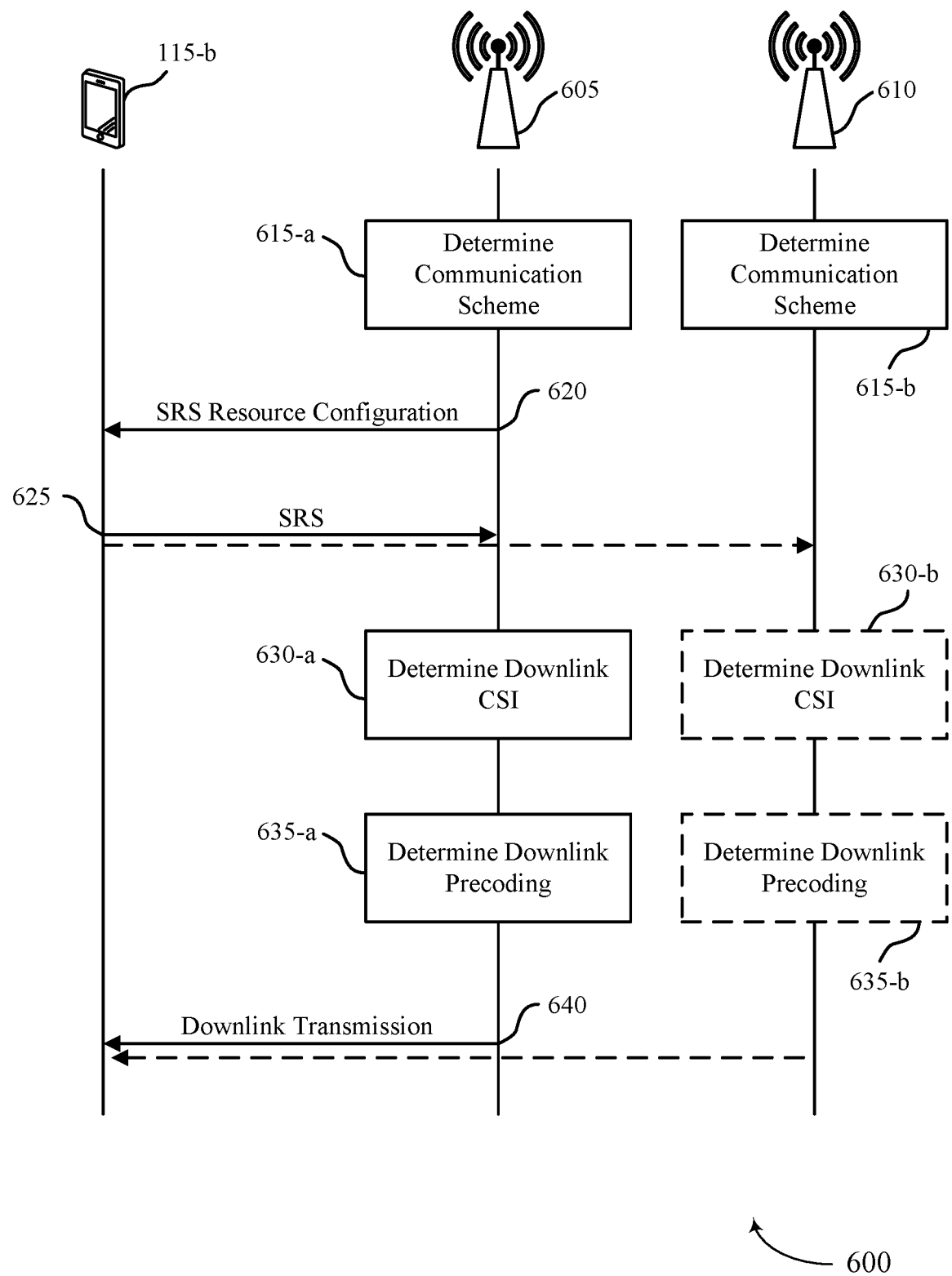
FIG. 6 illustrates an example of a process flow that supports techniques for deriving an SRS-based multi-TRP downlink precoding in accordance with aspects of the present disclosure.

FIG. 6 illustrates an example of a process flow 600 that supports techniques for deriving a sounding reference signal-based multi-transmission and reception point downlink precoding in accordance with aspects of the present disclosure. In some examples, the process flow 600 may implement aspects of the wireless communications system 100 or the wireless communications system 200.

For example, a UE 115-b may transmit one or more SRSs to one or more of multiple TRPs, such as a TRP 605 and a TRP 610, according to an SRS resource configuration and the TRP 605 and the TRP 610 may determine a downlink CSI based on the one or more SRSs received from the UE 115-b and may determine a downlink precoding for downlink transmissions to the UE 115-b based on the downlink CSI.

At 615, the TRP 605 and the TRP 610 may determine a multi-TRP communication scheme for communicating with the UE 115-b. For example, at 615-a, the TRP 605 may determine the multi-TRP communication scheme and, at 615-b, the TRP 610 may similarly determine the multi-TRP communication scheme. In some examples, both the TRP 605 and the TRP 610 may jointly determine the multi-TRP communication scheme. In some other examples, one of the TRP 605 or the TRP 610 may determine the multi-TRP communication scheme and the one of the TRP 605 or the TRP 610 may indicate the determined multi-TRP communication scheme to the other of the TRP 605 and the TRP 610 (e.g., via signaling). In some aspects, the multi-TRP communication scheme may be an SFN communication scheme, an SDM communication scheme, a TDM communication scheme, or an FDM communication scheme.

At 620, the TRP 605 may transmit an SRS resource configuration to the UE 115-b over a downlink channel. The SRS resource configuration may indicate, to the UE 115-b, at least one SRS resource over which the UE 115-b may transmit one or more SRSs. In some examples, the TRP 605 may transmit the SRS resource configuration to the UE 115-b via RRC signaling or via a MAC control element (MAC-CE). In some other examples, the TRP 605 may transmit the SRS resource configuration to the UE 115-b over a physical channel, such as a PDCCH. In some examples, the SRS resource configuration may be based on the multi-TRP communication scheme determined by the TRP 605 and the TRP 610 at 615. For instance, in examples in which the TRP 605 and the TRP 610 determine to apply an SFN communication scheme or an SDM communication scheme, the SRS resource configuration may indicate one SRS resource over which the UE 115-b may transmit an SRS to both of the TRP 605 and the TRP 610 simultaneously. Alternatively, in examples in which the TRP 605 and the TRP 610 determine to apply a TDM communication scheme or an FDM communication scheme, the SRS resource configuration may indicate multiple SRS resources such that the UE 115-b may transmit a first SRS to the TRP 605 over a first SRS resource and transmit a second SRS to the TRP 610 over a second SRS resource.

In some implementations, the SRS resource configuration may associate the at least one SRS resource with two or more downlink reference signals. Alternatively, in some other implementations, the TRP 605 may transmit separate configuration signaling to associate the at least one SRS resource with two or more downlink reference signals. In an example applicable to either implementation, the association may indicate that an SRS resource is indicated by the SRS resource configuration is associated with two downlink reference signals, including a first reference signal from the TRP 605 and a second reference signal from the TRP 610. In some aspects, the association may be via a spatial relation between the SRS resource and the two downlink reference signals. In some other aspects, the association may be via an uplink TCI state association between the SRS resource and the two downlink reference signals (e.g., an uplink TCI state for an SRS resource may be associated with the two downlink reference signals).

At 625, the UE 115-b may transmit one or more SRS to one or both of the TRP 605 or the TRP 610 over the at least one SRS resource indicated by the SRS resource configuration. For instance, in examples in which the SRS resource configuration indicates one SRS resource, the UE 115-b may transmit an SRS to the TRP 605 or to the TRP 610, or both, based on a capability (e.g., a multi-beam capability or a single-beam capability) of the UE 115-b. For example, if the UE 115-b has a multi-beam capability, the UE 115-b may transmit an SRS to both of the TRP 605 and the TRP 610 over the one SRS resource using two different transmit beams. For instance, the UE 115-b may simultaneously (e.g., over the one SRS resource) transmit a first SRS to the TRP 605 using a first transmit beam and a first antenna panel and a second SRS to the TRP 610 using a second transmit beam and a second antenna panel. If the UE 115-b has a single-beam capability, the UE 115-b may select one of the TRP 605 or the TRP 610 and focus an SRS towards the selected TRP.

Alternatively, in examples in which the SRS resource configuration indicates multiple SRS resources, the UE 115-*b* may transmit an SRS to each of the TRP 605 and the TRP 610 over different SRS resources of the multiple SRS resources. The UE 115-*b* may transmit the SRSs to the TRP 605 and the TRP 610 over the different SRS resources using one or more transmit beams and antenna panels of the UE 115-*b* (e.g., the UE 115-*b* may have a multi-beam capability or a single-beam capability for transmitting to the TRPs over different SRS resources).

At 630, the TRP 605 or the TRP 610, or both, may determine downlink CSI (e.g., determine one or more CSI values) associated with a downlink channel to the UE 115-*b* based on receiving an SRS from the UE 115-*b*. For instance, at 630-*a*, in examples in which the TRP 605 receives an SRS from the UE 115-*b*, the TRP 605 may measure a channel quality between the TRP 605 and the UE 115-*b* based on receiving the SRS and derive downlink CSI based on the measured channel quality. Similarly, at 630-*b*, in examples in which the TRP 610 receives an SRS from the UE 115-*b*, the TRP 610 may measure a channel quality between the TRP 610 and the UE 115-*b* based on receiving the SRS and may derive downlink CSI based on the measured channel quality. In some cases, both of the TRP 605 and the TRP 610 may receive an SRS from the UE 115-*b*, and both may determine downlink CSI. In some other cases, one of the TRP 605 or the TRP 610 (but not both) may receive an SRS from the UE 115-*b* and determine downlink CSI. In some examples, the TRP 605 or the TRP 610, or both, may determine the downlink CSI based on the measured channel quality based on using (e.g., assuming) channel reciprocity between the uplink channel over which the UE 115-*b* transmits an SRS and the downlink channel over which the TRP 605 or the TRP 610, or both, may transmit to the UE 115-*b*.

At 635, the TRP 605 or the TRP 610, or both (e.g., depending on which of the TRPs received and measured an SRS from the UE 115-*b*), may determine a downlink precoding for a downlink transmission to the UE 115-*b* based on the determined downlink CSI. For instance, at 635-*a*, in examples in which the TRP 605 receives an SRS from the UE 115-*b*, the TRP 605 may determine a downlink precoding based on the downlink CSI determined at 630-*a*. Similarly, at 635-*b*, in examples in which the TRP 610 receives an SRS from the UE 115-*b*, the TRP 610 may determine a downlink precoding based on the downlink CSI determined at 630-*b*. In some cases, the downlink precoding may include a precoding matrix. In some examples, the TRP 605 or the TRP 610, or both (e.g., depending on which of the TRPs received and measured an SRS from the UE 115-*b*), may determine a second multi-TRP communication scheme to apply for a downlink transmission to the UE 115-*b* based on the downlink CSI determined at 630.

At 640, one or both of the TRP 605 or the TRP 610 may transmit a downlink transmission to UE 115-*b* using the downlink precoding determined at 635. In some examples, the downlink transmission may be a joint transmission from the TRP 605 and the TRP 610 in accordance with a multi-TRP communication scheme determined based on the downlink CSI. In some other examples, one of the TRP 605 or the TRP 610 (but not both) may transmit the downlink transmission to the UE 115-*b* (e.g., by applying a single-TRP communication scheme). In some aspects, the downlink transmission may include a multi-TRP DMRS. In some examples, the downlink transmission may include downlink data and the TRP 605 or the TRP 610, or both, may transmit the downlink transmission to the UE 115-*b* over a PDSCH.

Figure 7:
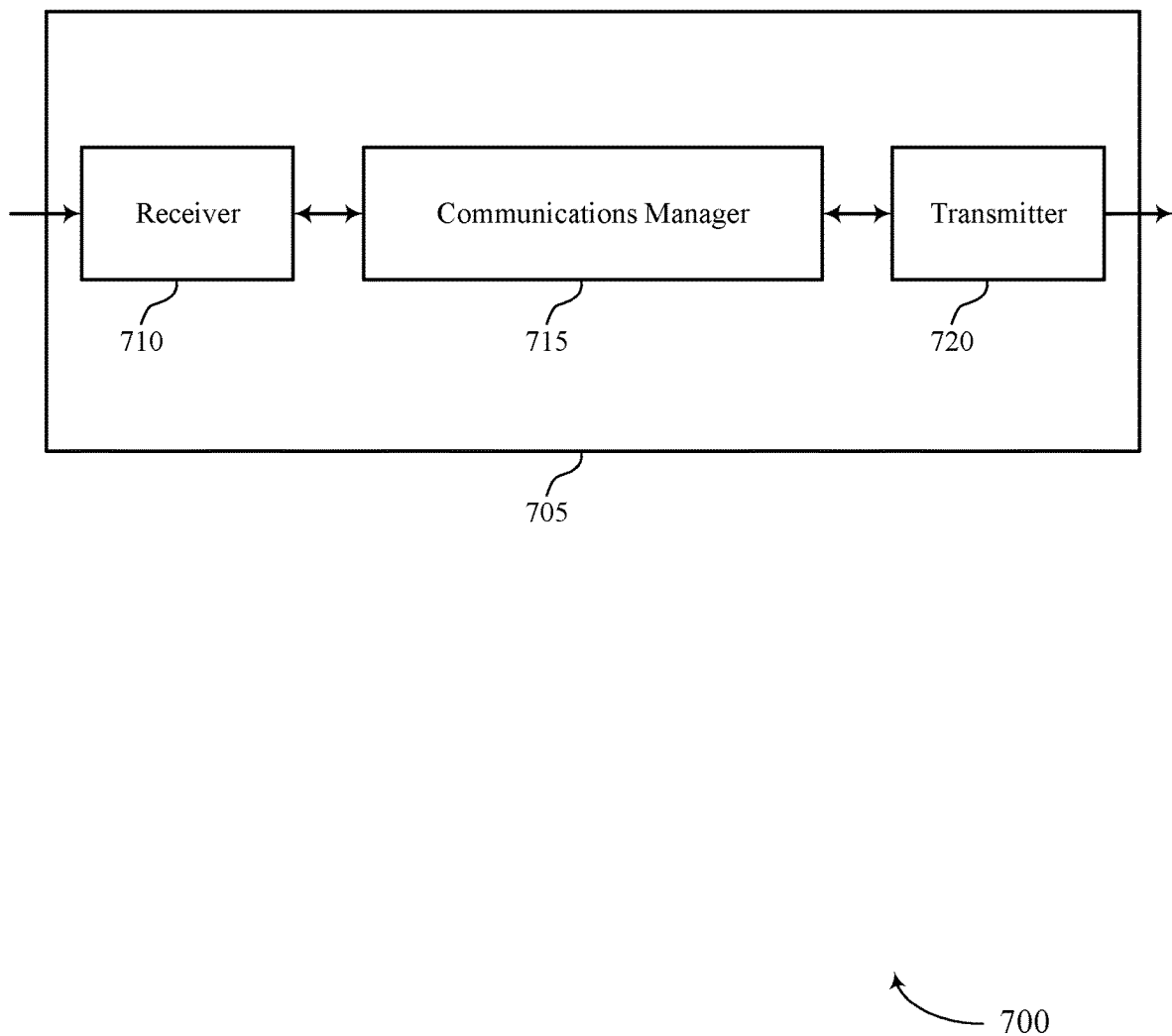
FIGS. 7 and 8 show block diagrams of devices that support techniques for deriving an SRS-based multi-TRP downlink precoding in accordance with aspects of the present disclosure.

FIG. 7 shows a block diagram 700 of a device 705 that supports techniques for deriving an SRS-based multi-TRP downlink precoding in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, or information related to techniques for deriving an SRS-based multi-TRP downlink precoding). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive an SRS resource configuration indicating at least one SRS resource, the SRS resource configuration based on a first multi-TRP communication scheme applied by two or more TRPs, transmit one or more SRSs over the at least one SRS resource according to the SRS resource configuration, and receive a downlink transmission from at least one of the two or more TRPs, the downlink transmission based on the one or more SRSs. The communications manager 715 may be an example of aspects of the communications manager 1010 described herein.

The communications manager 715, or its sub-components, may be implemented in hardware, software (e.g., executed by a processor), or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and the transmitter 720 may be implemented as analog components (for example, amplifiers, filters, antennas) coupled to the mobile device modem to enable wireless transmission and reception over one or more bands.

The communications manager 715 may be implemented to realize one or more potential advantages. In some implementations, the communications manager 715 may transmit one or more SRSs to one or more TRPs over one or more SRS resources configured for multi-TRP channel sounding by an SRS resource configuration. As such, the communications manager 715 may enable the receiving TRPs to derive a downlink CSI (assuming channel reciprocity) and to determine a downlink precoding or a multi-TRP or single-TRP communication scheme, or both, to use or apply for transmitting a downlink transmission to the device 705 according to a low-latency timeline. Based on facilitating SRS-based CSI acquisition in a multi-TRP communications system, the communications manager 715 may support timely CSI derivation such that the multiple TRPs from which the device 705 may receive downlink communication may determine an appropriate downlink precoding or communication scheme and transmit a downlink transmission to the device 705 in scenarios in which the device 705 is in a state of high mobility, such as in scenarios in which the device 705 is located on a high-speed train.

Further, based on implementing the described techniques, the communications manager 715 may refrain from calculating CSI for a relatively large quantity of CSI hypotheses within multi-TRP communications systems, which may reduce measurement overhead and processing burden for the communications manager 715 (or for one or more processing components of the communications manager 715). Accordingly, the communications manager 715 (or the one or more processing components of the communications manager 715) may enter a sleep mode for longer duration or more frequently, which may result in improved power savings and longer battery life at the device 705.

Figure 8:
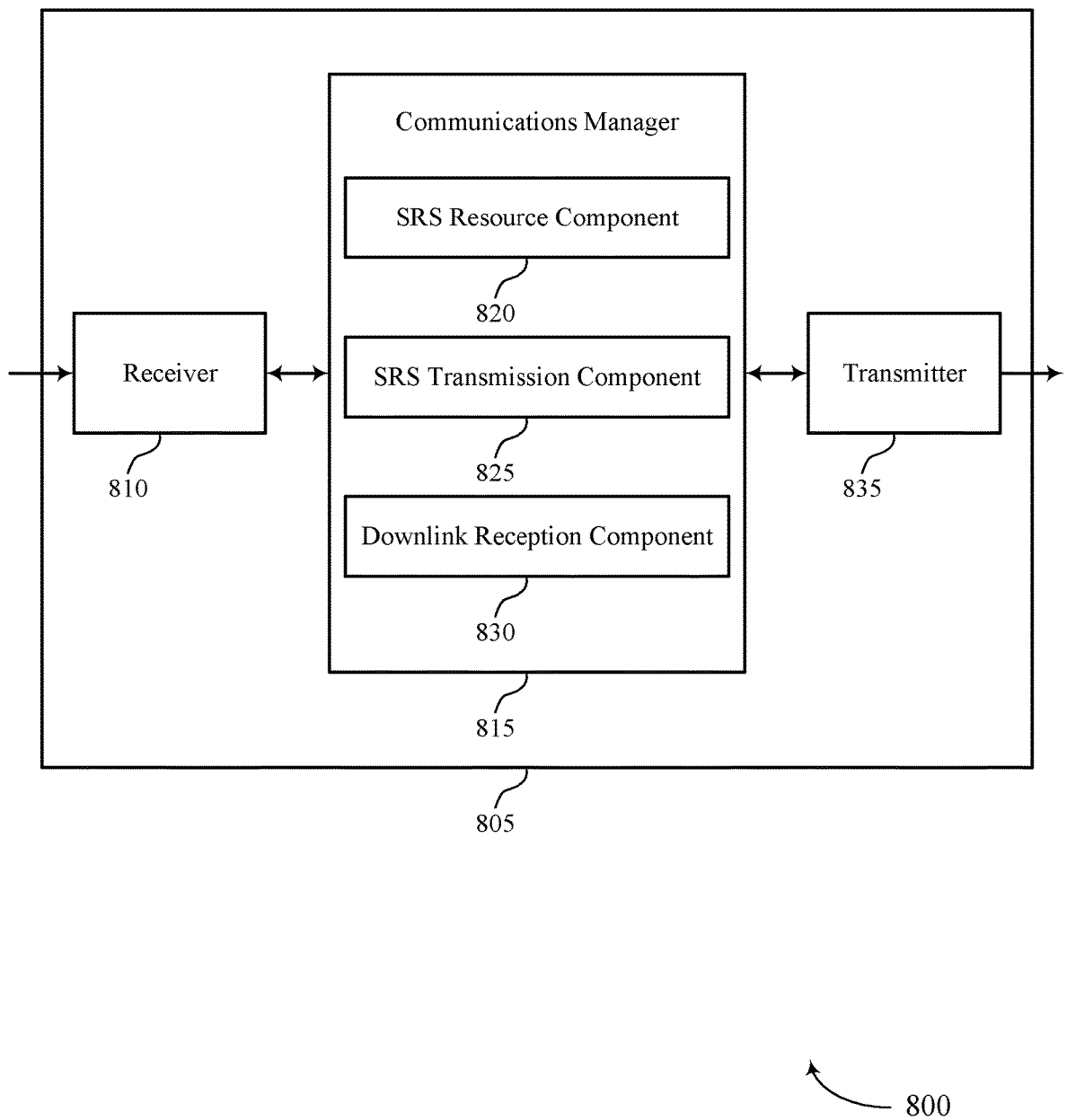

FIG. 8 shows a block diagram 800 of a device 805 that supports techniques for deriving an SRS-based multi-TRP downlink precoding in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, or information related to techniques for deriving an SRS-based multi-TRP downlink precoding). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an SRS resource component 820, an SRS transmission component 825, and a downlink reception component 830. The communications manager 815 may be an example of aspects of the communications manager 1010 described herein.

The SRS resource component 820 may receive an SRS resource configuration indicating at least one SRS resource, the SRS resource configuration based on a first multi-TRP communication scheme applied by two or more TRPs. The SRS transmission component 825 may transmit one or more SRSs over the at least one SRS resource according to the SRS resource configuration. The downlink reception component 830 may receive a downlink transmission from at least one of the two or more TRPs, the downlink transmission based on the one or more SRSs.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
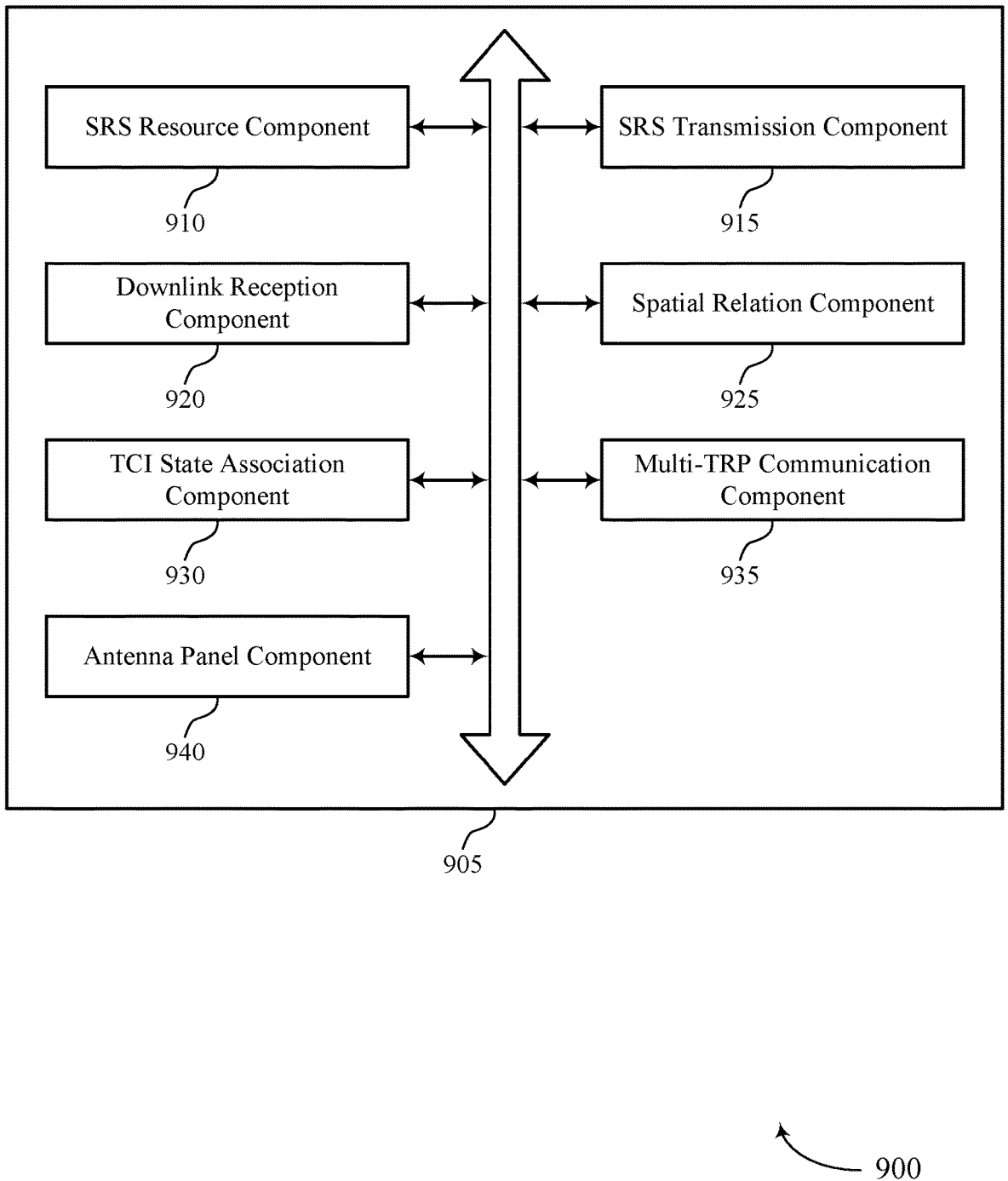
FIG. 9 shows a block diagram of a communications manager that supports techniques for deriving an SRS-based multi-TRP downlink precoding in accordance with aspects of the present disclosure.

FIG. 9 shows a block diagram 900 of a communications manager 905 that supports techniques for deriving an SRS-based multi-TRP downlink precoding in accordance with aspects of the present disclosure. The communications manager 905 may be an example of aspects of a communications manager 715, a communications manager 815, or a communications manager 1010 described herein. The communications manager 905 may include an SRS resource component 910, an SRS transmission component 915, a downlink reception component 920, a spatial relation component 925, a TCI state association component 930, a multi-TRP communication component 935, and an antenna panel component 940. Each of these modules may communicate, directly or indirectly, with one another (e.g., via one or more buses).

The SRS resource component 910 may receive an SRS resource configuration indicating at least one SRS resource, the SRS resource configuration based on a first multi-TRP communication scheme applied by two or more TRPs. In some examples, the SRS resource component 910 may receive a configuration associating the at least one SRS resource with two or more downlink reference signals, each of the two or more downlink reference signals from one of the two or more TRPs. In some examples, the SRS resource component 910 may receive an indication of one SRS resource. In some examples, the SRS resource component 910 may receive an indication of multiple SRS resources.

In some examples, the SRS resource component 910 may receive an SRS resource set configuration associated with an SRS resource set including a set of SRS resources, the set of SRS resources including the at least one SRS resource. In some cases, the two or more downlink reference signals include two or more CSI-RSs, two or more TRSs, or two or more SSBs. In some cases, the SRS resource configuration is part of an SRS-based multi-TRP downlink precoding procedure in which the UE receives the downlink transmission associated with the downlink precoding based on transmitting the one or more SRSs to the two or more TRPs.

The SRS transmission component 915 may transmit one or more SRSs over the at least one SRS resource according to the SRS resource configuration. In some examples, the SRS transmission component 915 may transmit the one or more SRSs to each of the two or more TRPs over the one SRS resource. In some examples, the SRS transmission component 915 may transmit an SRS over each of the multiple SRS resources to a different one of the two or more TRPs.

In some examples, the SRS transmission component 915 may transmit a first SRS to a first TRP of the two or more TRPs using a first transmit beam and a first antenna panel of the UE and a second SRS to a second TRP of the two or more TRPs using a second transmit beam and a second antenna panel of the UE simultaneously. In some examples, the SRS transmission component 915 may transmit one SRS to one of the two or more TRPs using a transmit beam and an antenna panel of the UE.

The downlink reception component 920 may receive a downlink transmission from at least one of the two or more TRPs, the downlink transmission based on the one or more SRSs. In some examples, the downlink reception component 920 may receive DCI scheduling the downlink transmission, the DCI including information associated with a downlink reception beam to be used by the UE. In some examples, the downlink reception component 920 may select the downlink reception beam based on the information associated with the downlink reception beam included in the DCI, where receiving the downlink transmission is based on receiving the DCI and selecting the downlink reception beam.

In some examples, the downlink reception component 920 may receive a TCI codepoint associated with two or more downlink reference signals that are associated with the at least one SRS resource, where selecting the downlink reception beam is based on the TCI codepoint. In some examples, the downlink reception component 920 may receive an SRI or a TCI state associated with the at least one SRS resource, where selecting the downlink reception beam is based on the SRI or the TCI state. In some examples, the downlink reception component 920 may receive the downlink transmission from each of the two or more TRPs according to a second multi-TRP communication scheme based on the one or more SRSs.

In some examples, the downlink reception component 920 may receive the downlink transmission from one of the two or more TRPs according to a single-TRP communication scheme based on the one or more SRSs. In some cases, the downlink transmission includes a multi-TRP demodulation reference signal. In some cases, the downlink transmission is associated with a downlink precoding, a rank, or an MCS that is based on the one or more SRSs.

The spatial relation component 925 may receive an indication of a spatial relation between the at least one SRS resource and the two or more downlink reference signals.

The TCI state association component 930 may receive an indication, for the at least one SRS resource, of an uplink TCI state associated with the two or more downlink reference signals.

The multi-TRP communication component 935 may communicate with multiple TRPs according to a multi-TRP communication scheme. In some cases, the first multi-TRP communication scheme includes an SFN communication scheme or an SDM communication scheme. In some cases, the first multi-TRP communication scheme includes a TDM communication scheme or an FDM communication scheme. In some cases, the first multi-TRP communication scheme and the second multi-TRP communication scheme include a TDM communication scheme, an FDM communication scheme, an SDM communication scheme, an SFN communication scheme, or any combination thereof.

The antenna panel component 940 may receive an indication of an association between each of the at least one SRS resource and one or more antenna panels of the UE. In some examples, the antenna panel component 940 may receive an indication of an antenna panel switching pattern for changing the association between each of the at least one SRS resource and the one or more antenna panels of the UE over time.

Figure 10:
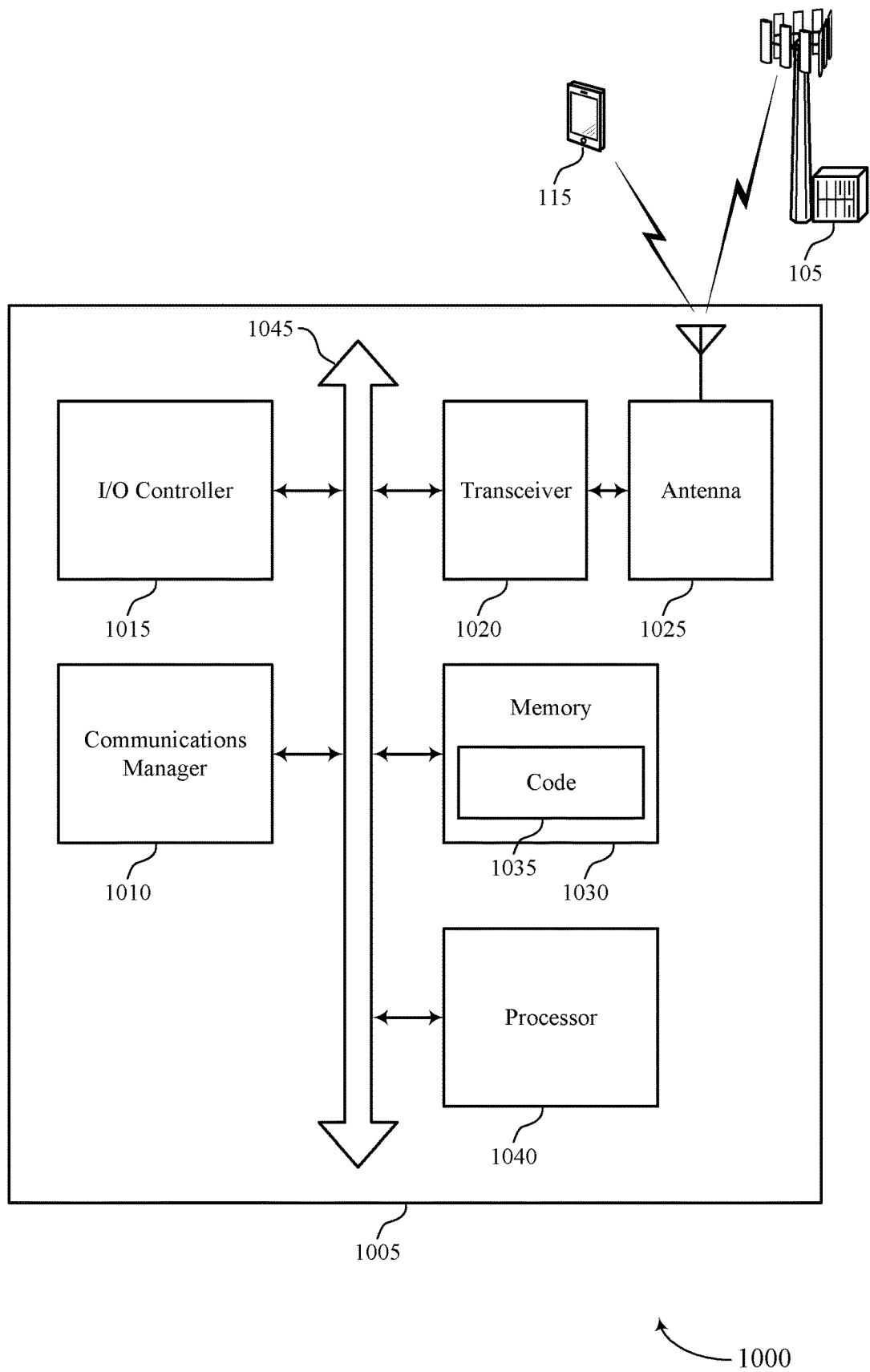
FIG. 10 shows a diagram of a system including a device that supports techniques for deriving an SRS-based multi-TRP downlink precoding in accordance with aspects of the present disclosure.

FIG. 10 shows a diagram of a system 1000 including a device 1005 that supports techniques for deriving an SRS-based multi-TRP downlink precoding in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication or coupled via one or more buses (e.g., bus 1045).

The communications manager 1010 may receive an SRS resource configuration indicating at least one SRS resource, the SRS resource configuration based on a first multi-TRP communication scheme applied by two or more TRPs, transmit one or more SRSs over the at least one SRS resource according to the SRS resource configuration, and receive a downlink transmission from at least one of the two or more TRPs, the downlink transmission based on the one or more SRSs.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for deriving an SRS-based multi-TRP downlink precoding).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
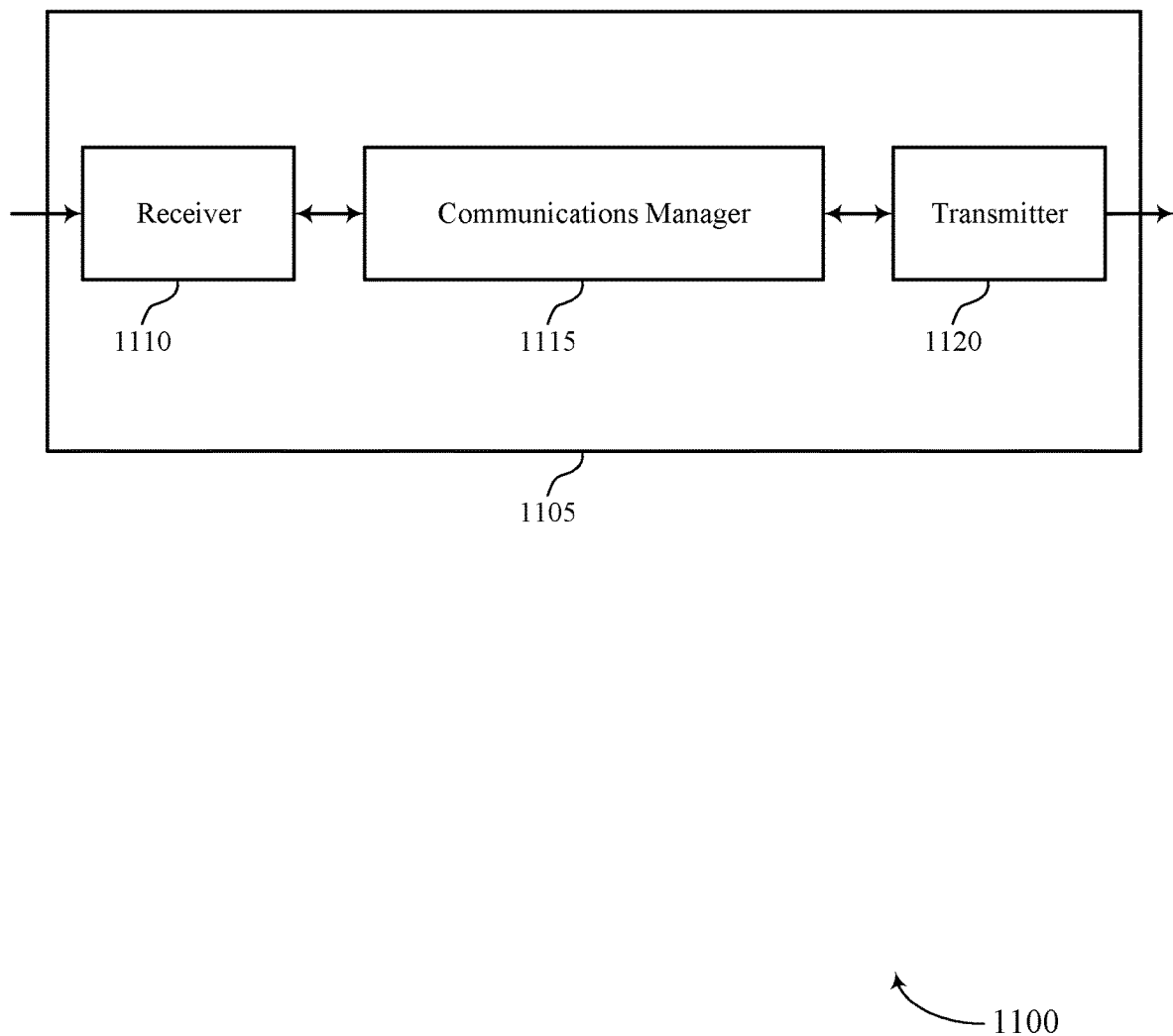
FIGS. 11 and 12 show block diagrams of devices that support techniques for deriving an SRS-based multi-TRP downlink precoding in accordance with aspects of the present disclosure.

FIG. 11 shows a block diagram 1100 of a device 1105 that supports techniques for deriving an SRS-based multi-TRP downlink precoding in accordance with aspects of the present disclosure. The device 1105 may be an example of aspects of a base station 105 or a TRP as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, or information related to techniques for deriving an SRS-based multi-TRP downlink precoding). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, an SRS resource configuration indicating at least one SRS resource, the SRS resource configuration based on a first multi-TRP communication scheme applied by the first TRP and a second TRP, receive, from the UE, an SRS over an SRS resource of the at least one SRS resource according to the SRS resource configuration, measure a channel quality associated with a downlink channel between the first TRP and the UE based on the SRS, and transmit, to the UE, a downlink transmission using a downlink precoding, the downlink precoding based on the channel quality. The communications manager 1115 may be an example of aspects of the communications manager 1410 described herein.

The communications manager 1115, or its sub-components, may be implemented in hardware, software (e.g., executed by a processor), or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Based on implementing the described techniques, the communications manager 1115 may be able to transmit one or more downlink transmissions (e.g., downlink data) to a UE 115 using an appropriate downlink precoding or by applying a suitable communication scheme based on deriving SRS-based downlink CSI. Accordingly, the UE 115 may experience a greater likelihood to successfully receive and decode the one or more downlink transmissions, which may reduce a number of potential re-transmissions from the communications manager 1115. Further, based on reducing a number of potential re-transmissions, the communications manager 1115 may experience lower signaling overhead, facilitate lower overall interference within the multi-TRP communications system, achieve higher data rates, or obtain greater spectral efficiency, among other benefits.

Figure 12:
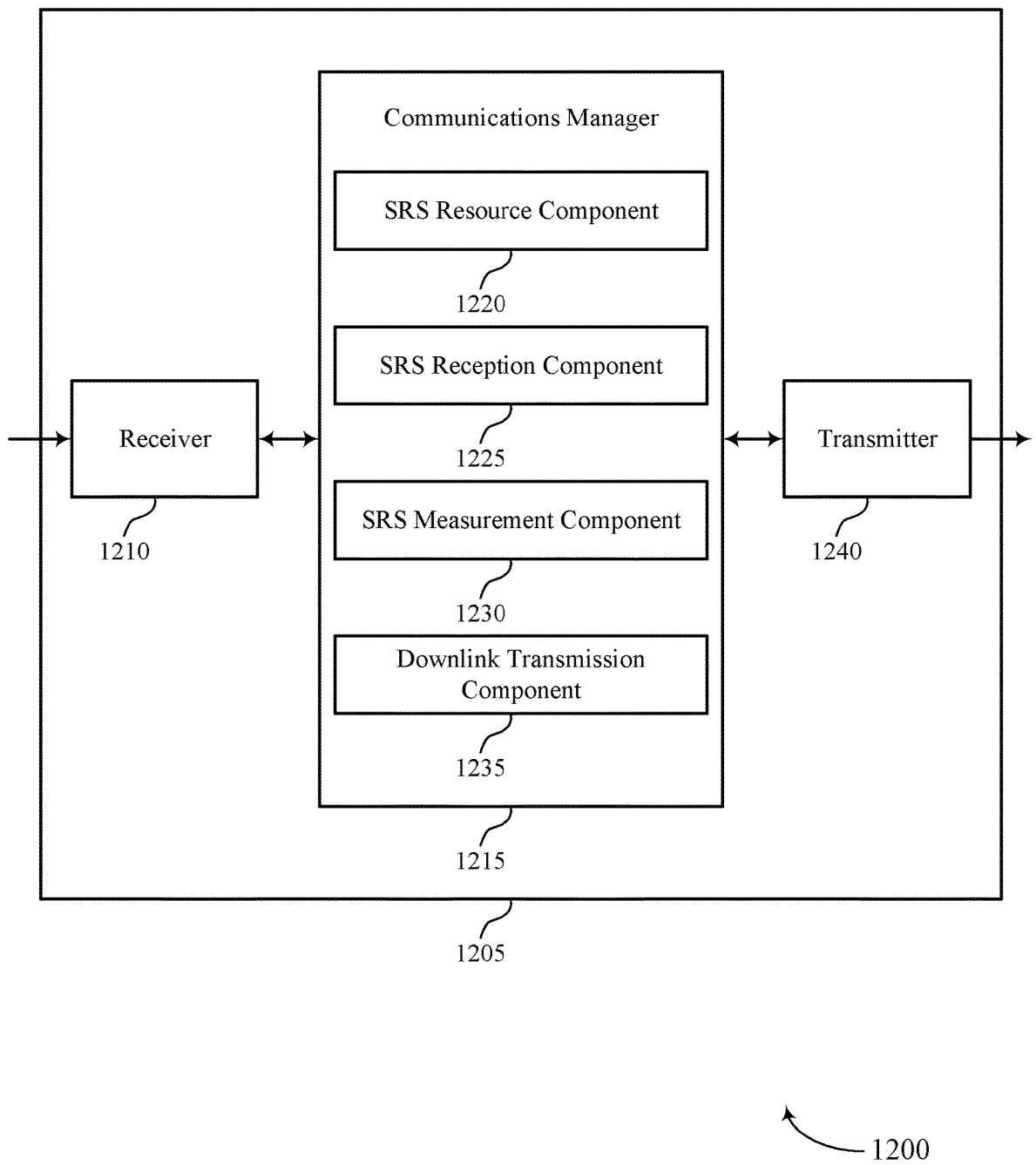

FIG. 12 shows a block diagram 1200 of a device 1205 that supports techniques for deriving an SRS-based multi-TRP downlink precoding in accordance with aspects of the present disclosure. The device 1205 may be an example of aspects of a device 1105, a base station 105, or a TRP as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, or information related to techniques for deriving an SRS-based multi-TRP downlink precoding). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SRS resource component 1220, an SRS reception component 1225, an SRS measurement component 1230, and a downlink transmission component 1235. The communications manager 1215 may be an example of aspects of the communications manager 1410 described herein.

The SRS resource component 1220 may transmit, to a UE, an SRS resource configuration indicating at least one SRS resource, the SRS resource configuration based on a first multi-TRP communication scheme applied by the first TRP and a second TRP. The SRS reception component 1225 may receive, from the UE, an SRS over an SRS resource of the at least one SRS resource according to the SRS resource configuration. The SRS measurement component 1230 may measure a channel quality associated with a downlink channel between the first TRP and the UE based on the SRS. The downlink transmission component 1235 may transmit, to the UE, a downlink transmission using a downlink precoding, the downlink precoding based on the channel quality.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
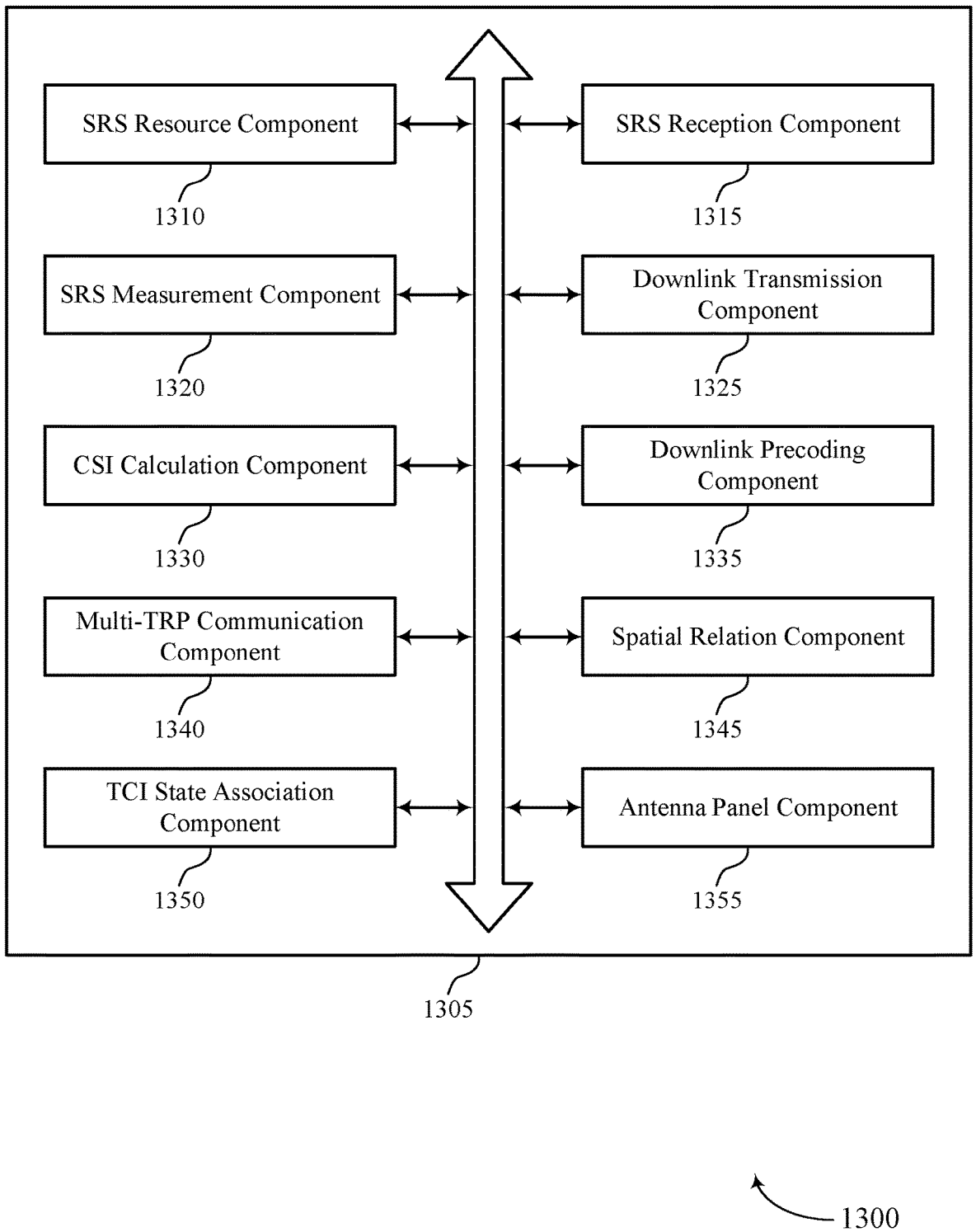
FIG. 13 shows a block diagram of a communications manager that supports techniques for deriving an SRS-based multi-TRP downlink precoding in accordance with aspects of the present disclosure.

FIG. 13 shows a block diagram 1300 of a communications manager 1305 that supports techniques for deriving an SRS-based multi-TRP downlink precoding in accordance with aspects of the present disclosure. The communications manager 1305 may be an example of aspects of a communications manager 1115, a communications manager 1215, or a communications manager 1410 described herein. The communications manager 1305 may include an SRS resource component 1310, an SRS reception component 1315, an SRS measurement component 1320, a downlink transmission component 1325, a CSI calculation component 1330, a downlink precoding component 1335, a multi-TRP communication component 1340, a spatial relation component 1345, a TCI state association component 1350, and an antenna panel component 1355. Each of these modules may communicate, directly or indirectly, with one another (e.g., via one or more buses).

The SRS resource component 1310 may transmit, to a UE, an SRS resource configuration indicating at least one SRS resource, the SRS resource configuration based on a first multi-TRP communication scheme applied by the first TRP and a second TRP. In some examples, the SRS resource component 1310 may transmit, to the UE, a configuration associating the at least one SRS resource with two or more downlink reference signals, the two or more downlink reference signals including a first downlink reference signal from the first TRP and a second downlink reference signal from the second TRP. In some examples, the SRS resource component 1310 may transmit an indication of one SRS resource, the one SRS resource assigned for an SRS transmission to the first TRP and the second TRP.

In some examples, the SRS resource component 1310 may transmit an indication of multiple SRS resources including a first SRS resource and a second SRS resource, the first SRS resource assigned for a first SRS transmission to the first TRP and the second SRS resource assigned for a second SRS transmission to the second TRP. In some examples, the SRS resource component 1310 may transmit an SRS resource set configuration associated with an SRS resource set including a set of SRS resources, the set of SRS resources including the at least one SRS resource. In some cases, the two or more downlink reference signals include two or more CSI-RSs, two or more TRSs, or two or more SSBs.

The SRS reception component 1315 may receive, from the UE, an SRS over an SRS resource of the at least one SRS resource according to the SRS resource configuration. In some examples, the SRS reception component 1315 may receive the SRS over the one SRS resource. In some examples, the SRS reception component 1315 may receive the SRS over the first SRS resource assigned for the first SRS transmission to the first TRP.

The SRS measurement component 1320 may measure a channel quality associated with a downlink channel between the first TRP and the UE based on the SRS.

The downlink transmission component 1325 may transmit, to the UE, a downlink transmission using a downlink precoding, the downlink precoding based on the channel quality. In some examples, the downlink transmission component 1325 may transmit the downlink transmission according to a second multi-TRP scheme based on the CSI. In some examples, the downlink transmission component 1325 may transmit the downlink transmission according to a single-TRP scheme based on the CSI.

In some examples, the downlink transmission component 1325 may transmit DCI scheduling the downlink transmission, the DCI including information associated with a downlink reception beam to be used by the UE for receiving the downlink transmission. In some examples, the downlink transmission component 1325 may transmit a TCI codepoint associated with two or more downlink reference signals that are associated with the at least one SRS resource, where the information associated with the downlink reception beam includes the TCI codepoint. In some examples, the downlink transmission component 1325 may transmit an SRI or a TCI state associated with the at least one SRS resource, where the information associated with the downlink reception beam includes the SRI or the TCI state. In some cases, the downlink transmission includes a multi-TRP demodulation reference signal.

The CSI calculation component 1330 may determine a CSI associated with the downlink channel between the first TRP and the UE based on the channel quality.

The downlink precoding component 1335 may determine the downlink precoding based on the CSI, where transmitting the downlink transmission using the downlink precoding is based on determining the downlink precoding.

The multi-TRP communication component 1340 may communicate with a UE 115 in coordination with other TRPs according to a multi-TRP communication scheme. In some cases, the first multi-TRP communication scheme and the second multi-TRP communication scheme include a TDM communication scheme, an FDM communication scheme, an SDM communication scheme, an SFN communication scheme, or any combination thereof.

In some cases, the first multi-TRP communication scheme includes an SFN communication scheme or an SDM communication scheme. In some cases, the first multi-TRP communication scheme includes a TDM communication scheme or an FDM communication scheme. In some cases, the SRS resource configuration is part of an SRS-based multi-TRP downlink precoding procedure in which the first TRP transmits the downlink transmission using the downlink precoding based on receiving the SRS from the UE.

The spatial relation component 1345 may transmit an indication of a spatial relation between the at least one SRS resource and the two or more downlink reference signals.

The TCI state association component 1350 may transmit an indication, for the at least one SRS resource, of an uplink TCI state associated with the two or more downlink reference signals.

The antenna panel component 1355 may transmit an indication of an association between each of the at least one SRS resource and one or more antenna panels of the UE. In some examples, the antenna panel component 1355 may transmit an indication of an antenna panel switching pattern for changing the association between each of the at least one SRS resource and the one or more antenna panels of the UE over time.

Figure 14:
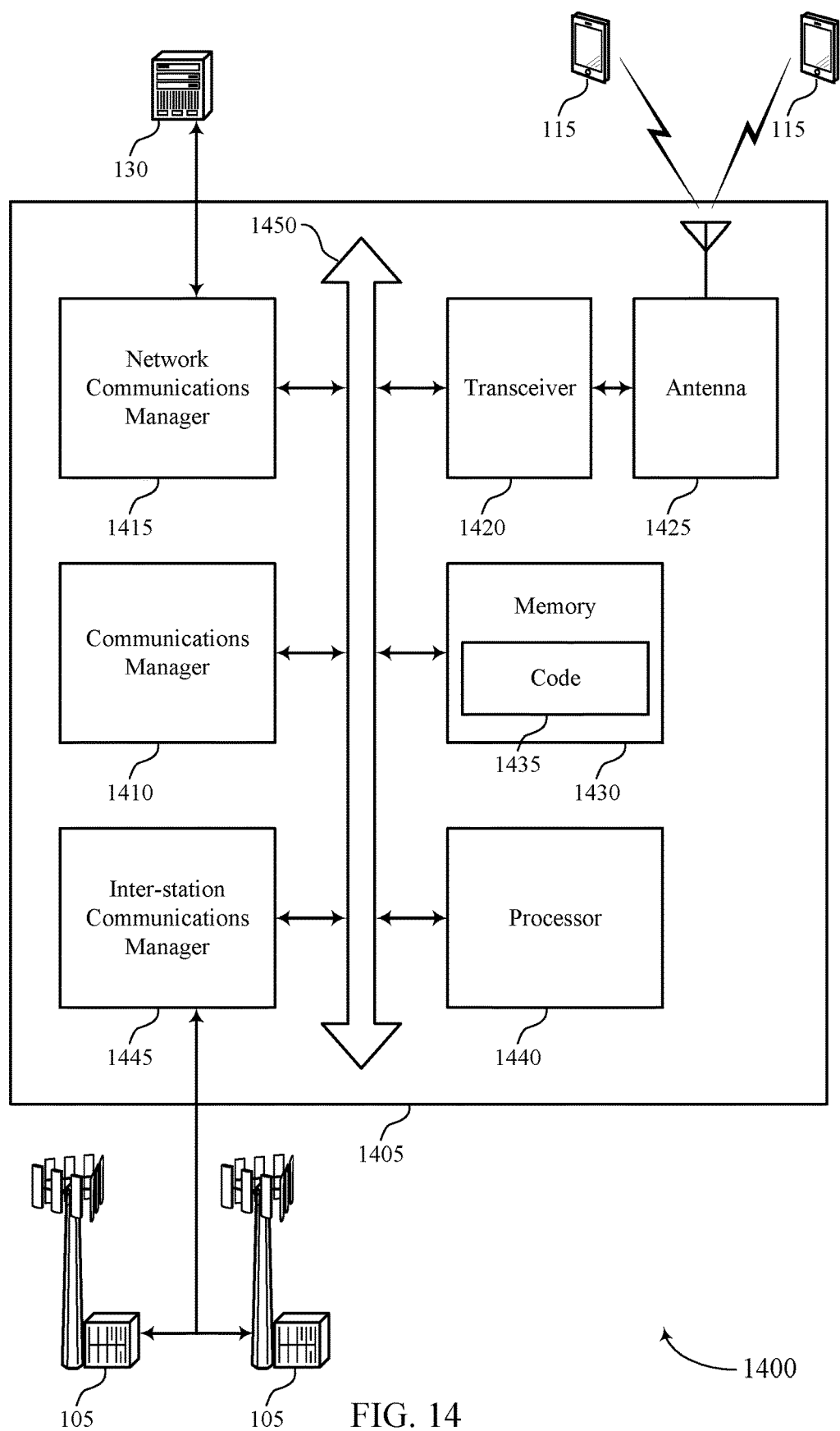
FIG. 14 shows a diagram of a system including a device that supports techniques for deriving an SRS-based multi-TRP downlink precoding in accordance with aspects of the present disclosure.

FIG. 14 shows a diagram of a system 1400 including a device 1405 that supports techniques for deriving an SRS-based multi-TRP downlink precoding in accordance with aspects of the present disclosure. The device 1405 may be an example of or include the components of device 1105, device 1205, a base station 105, or a TRP as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication or coupled via one or more buses (e.g., bus 1450).

The communications manager 1410 may transmit, to a UE, an SRS resource configuration indicating at least one SRS resource, the SRS resource configuration based on a first multi-TRP communication scheme applied by the first TRP and a second TRP, receive, from the UE, an SRS over an SRS resource of the at least one SRS resource according to the SRS resource configuration, measure a channel quality associated with a downlink channel between the first TRP and the UE based on the SRS, and transmit, to the UE, a downlink transmission using a downlink precoding, the downlink precoding based on the channel quality.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for deriving an SRS-based multi-TRP downlink precoding).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
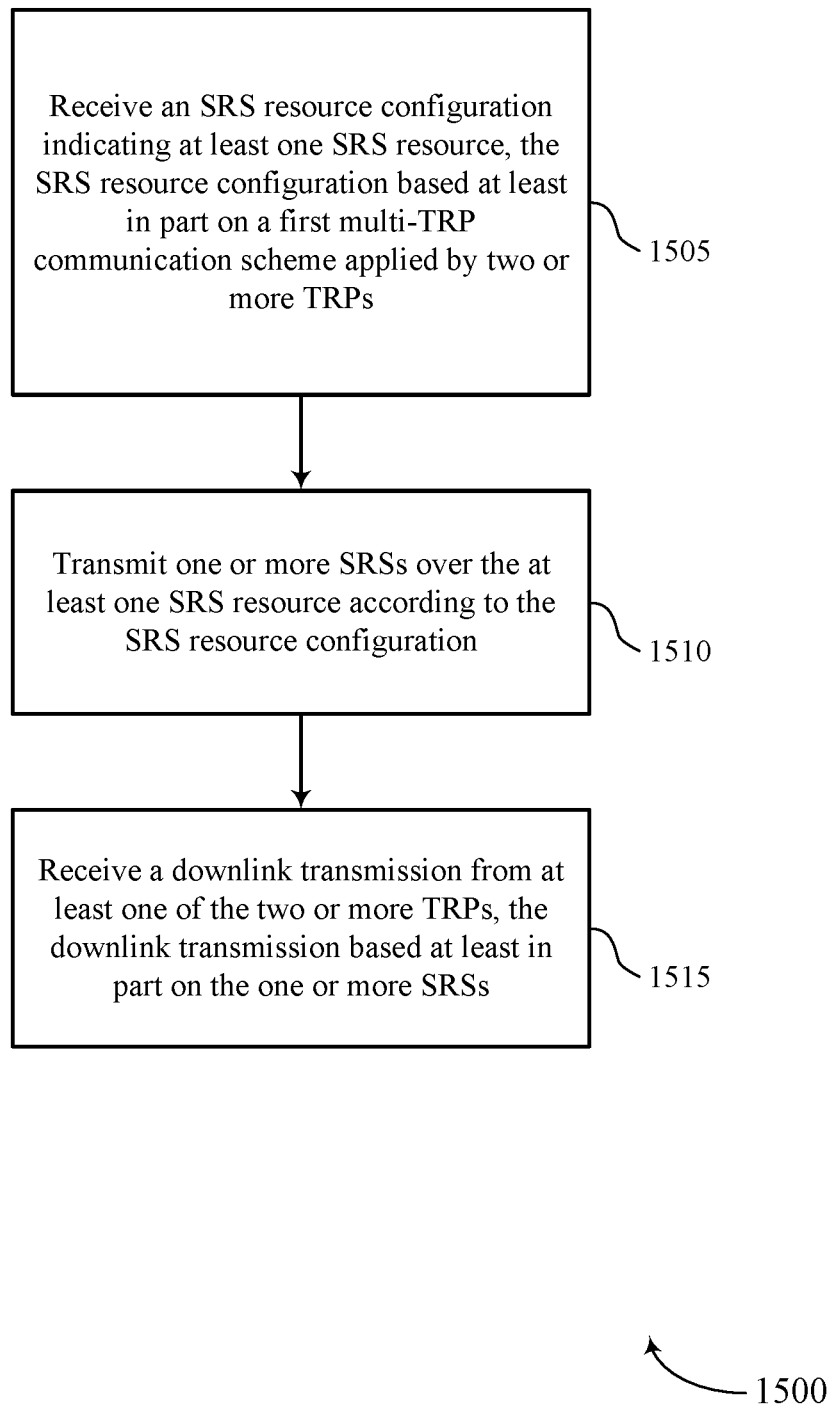
FIGS. 15 through 20 show flowcharts illustrating methods that support techniques for deriving an SRS-based multi-TRP downlink precoding in accordance with aspects of the present disclosure.

FIG. 15 shows a flowchart illustrating a method 1500 that supports techniques for deriving an SRS-based multi-TRP downlink precoding in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive an SRS resource configuration indicating at least one SRS resource, the SRS resource configuration based at least in part on a first multi-TRP communication scheme applied by two or more TRPs. The operations of 1505 may be performed according to the methods described herein. In some examples, aspects of the operations of 1505 may be performed by an SRS resource component as described with reference to FIGS. 7 through 10.

At 1510, the UE may transmit one or more SRSs over the at least one SRS resource according to the SRS resource configuration. The operations of 1510 may be performed according to the methods described herein. In some examples, aspects of the operations of 1510 may be performed by an SRS transmission component as described with reference to FIGS. 7 through 10.

At 1515, the UE may receive a downlink transmission from at least one of the two or more TRPs, the downlink transmission based at least in part on the one or more SRSs. The operations of 1515 may be performed according to the methods described herein. In some examples, aspects of the operations of 1515 may be performed by a downlink reception component as described with reference to FIGS. 7 through 10.

Figure 16:
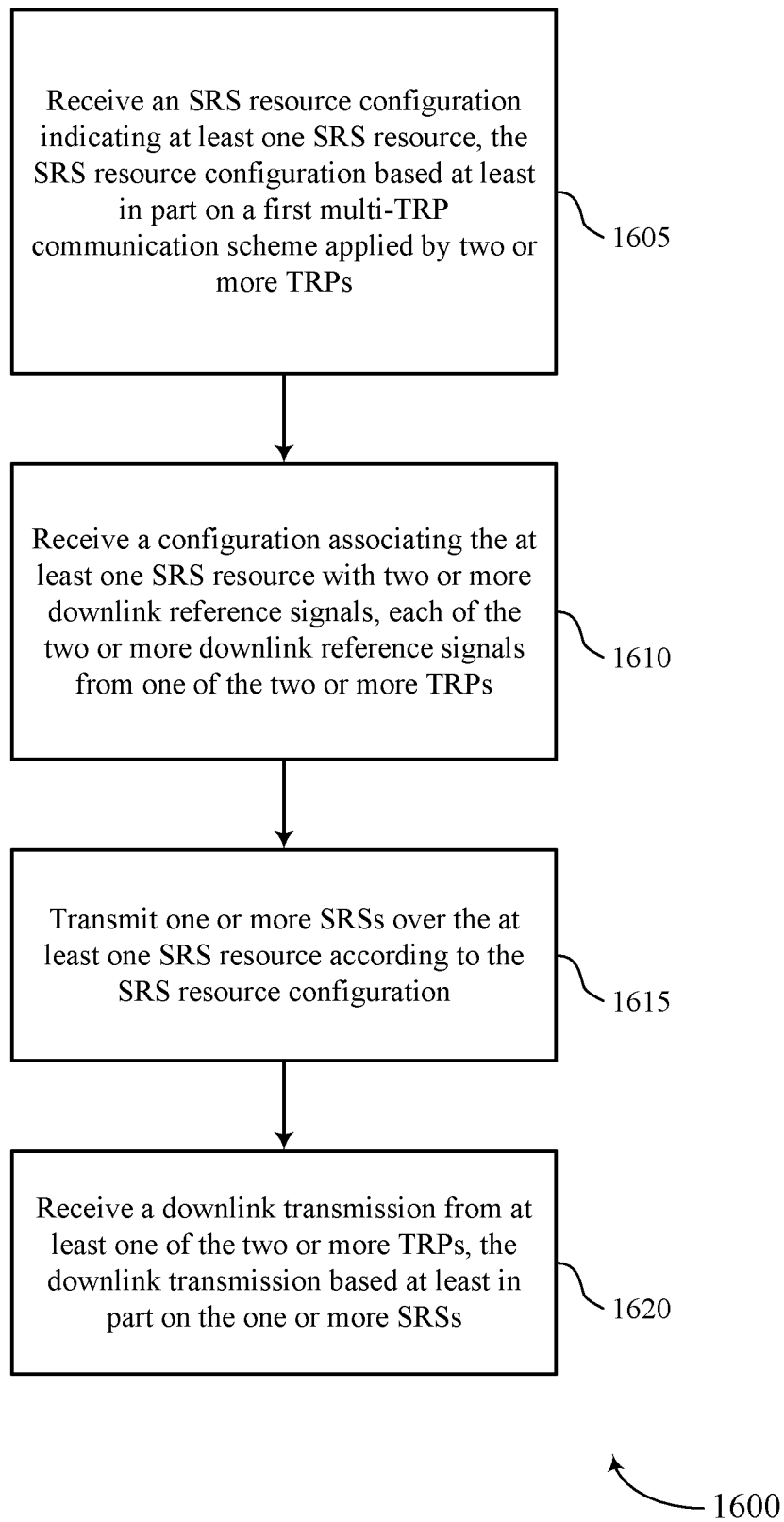

FIG. 16 shows a flowchart illustrating a method 1600 that supports techniques for deriving an SRS-based multi-TRP downlink precoding in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive an SRS resource configuration indicating at least one SRS resource, the SRS resource configuration based at least in part on a first multi-TRP communication scheme applied by two or more TRPs. The operations of 1605 may be performed according to the methods described herein. In some examples, aspects of the operations of 1605 may be performed by an SRS resource component as described with reference to FIGS. 7 through 10.

At 1610, the UE may receive a configuration associating the at least one SRS resource with two or more downlink reference signals, each of the two or more downlink reference signals from one of the two or more TRPs. The operations of 1610 may be performed according to the methods described herein. In some examples, aspects of the operations of 1610 may be performed by an SRS resource component as described with reference to FIGS. 7 through 10.

At 1615, the UE may transmit one or more SRSs over the at least one SRS resource according to the SRS resource configuration. The operations of 1615 may be performed according to the methods described herein. In some examples, aspects of the operations of 1615 may be performed by an SRS transmission component as described with reference to FIGS. 7 through 10.

At 1620, the UE may receive a downlink transmission from at least one of the two or more TRPs, the downlink transmission based at least in part on the one or more SRSs. The operations of 1620 may be performed according to the methods described herein. In some examples, aspects of the operations of 1620 may be performed by a downlink reception component as described with reference to FIGS. 7 through 10.

Figure 17:
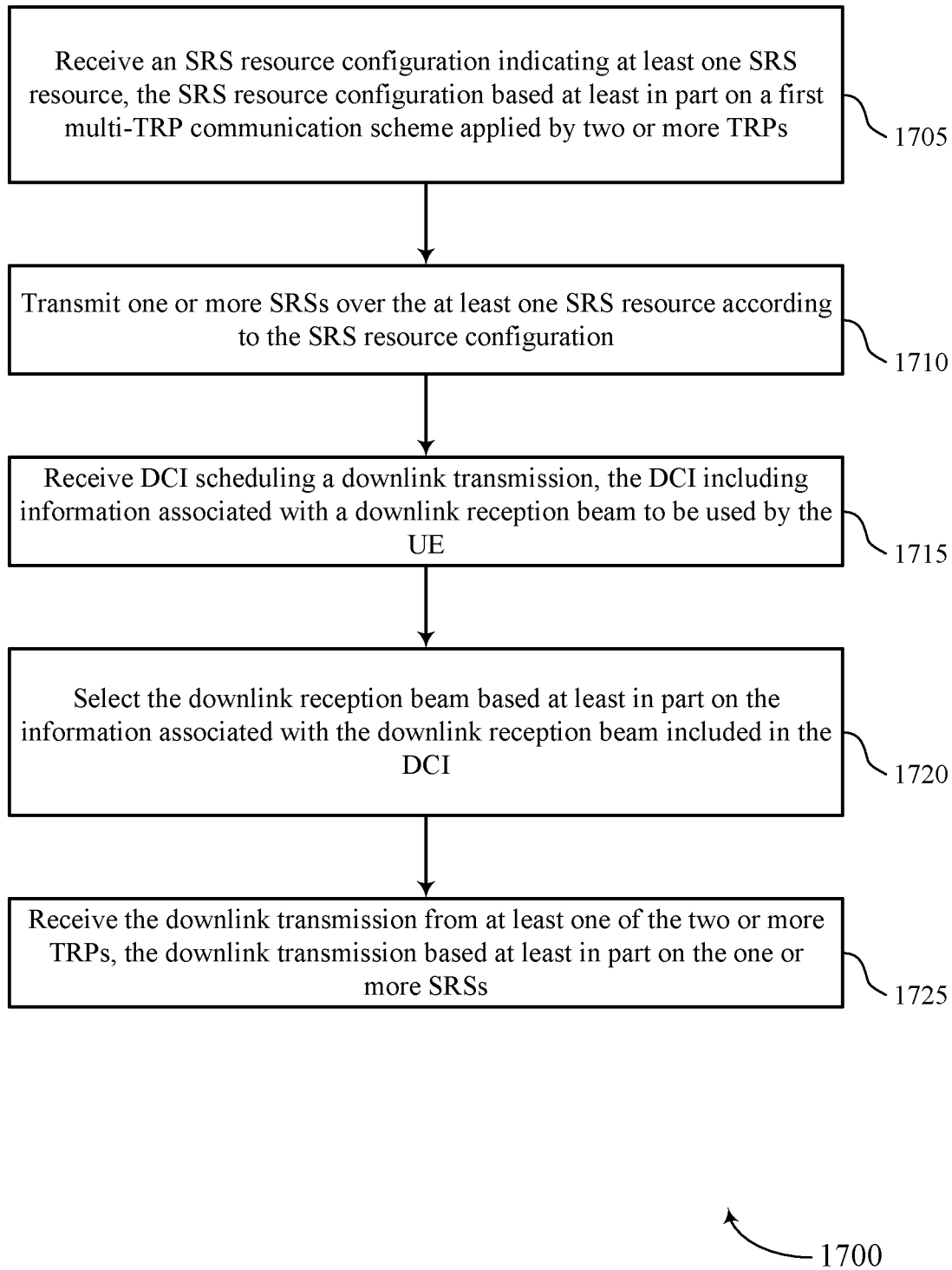

FIG. 17 shows a flowchart illustrating a method 1700 that supports techniques for deriving an SRS-based multi-TRP downlink precoding in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive an SRS resource configuration indicating at least one SRS resource, the SRS resource configuration based at least in part on a first multi-TRP communication scheme applied by two or more TRPs. The operations of 1705 may be performed according to the methods described herein. In some examples, aspects of the operations of 1705 may be performed by an SRS resource component as described with reference to FIGS. 7 through 10.

At 1710, the UE may transmit one or more SRSs over the at least one SRS resource according to the SRS resource configuration. The operations of 1710 may be performed according to the methods described herein. In some examples, aspects of the operations of 1710 may be performed by an SRS transmission component as described with reference to FIGS. 7 through 10.

At 1715, the UE may receive DCI scheduling a downlink transmission, the DCI including information associated with a downlink reception beam to be used by the UE. The operations of 1715 may be performed according to the methods described herein. In some examples, aspects of the operations of 1715 may be performed by a downlink reception component as described with reference to FIGS. 7 through 10.

At 1720, the UE may select the downlink reception beam based at least in part on the information associated with the downlink reception beam included in the DCI. The operations of 1720 may be performed according to the methods described herein. In some examples, aspects of the operations of 1720 may be performed by a downlink reception component as described with reference to FIGS. 7 through 10.

At 1725, the UE may receive the downlink transmission from at least one of the two or more TRPs, the downlink transmission based at least in part on the one or more SRSs. The operations of 1725 may be performed according to the methods described herein. In some examples, aspects of the operations of 1725 may be performed by a downlink reception component as described with reference to FIGS. 7 through 10.

Figure 18:
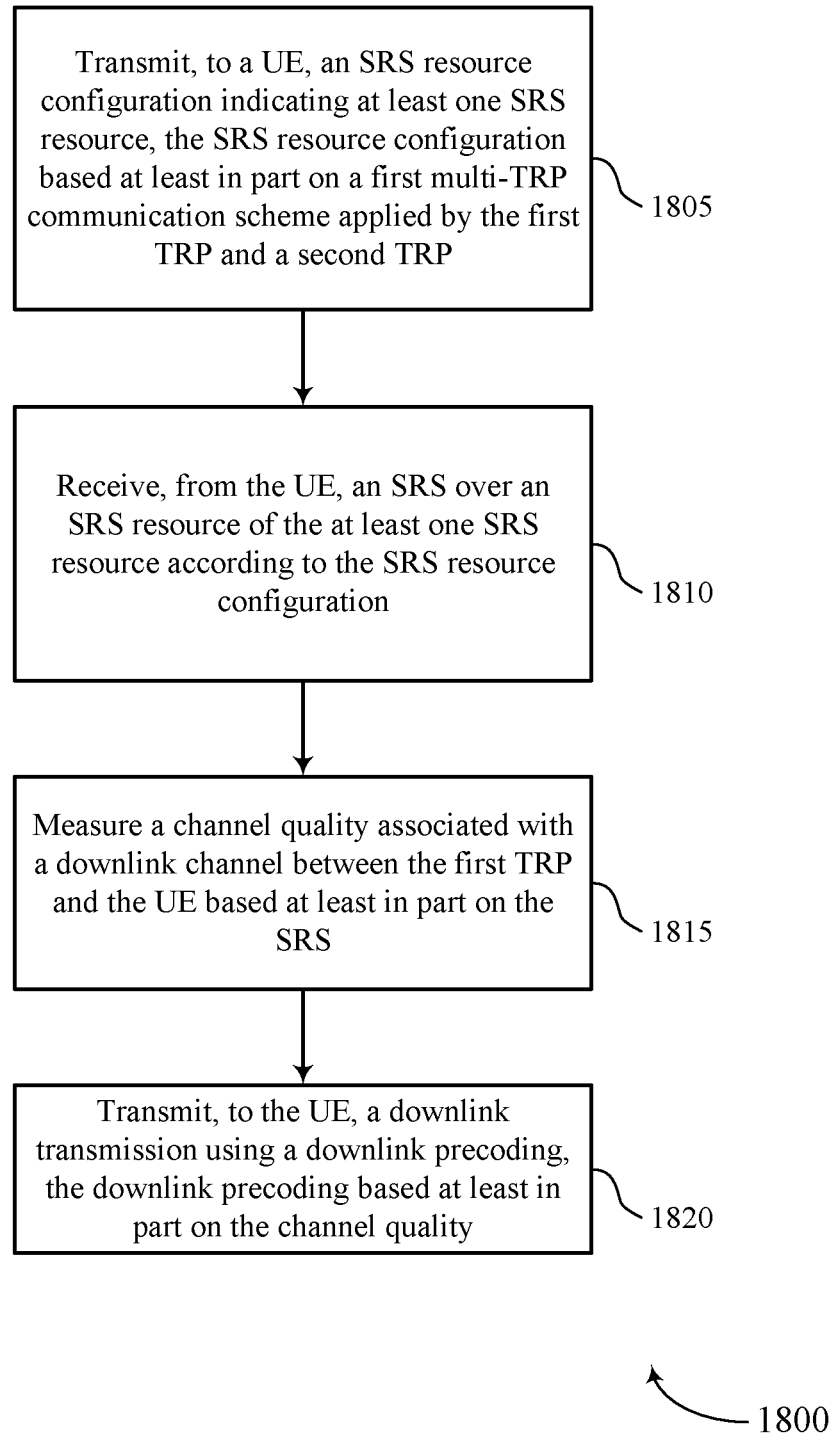

FIG. 18 shows a flowchart illustrating a method 1800 that supports techniques for deriving an SRS-based multi-TRP downlink precoding in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, an SRS resource configuration indicating at least one SRS resource, the SRS resource configuration based at least in part on a first multi-TRP communication scheme applied by the first TRP and a second TRP. The operations of 1805 may be performed according to the methods described herein. In some examples, aspects of the operations of 1805 may be performed by an SRS resource component as described with reference to FIGS. 11 through 14.

At 1810, the base station may receive, from the UE, an SRS over an SRS resource of the at least one SRS resource according to the SRS resource configuration. The operations of 1810 may be performed according to the methods described herein. In some examples, aspects of the operations of 1810 may be performed by an SRS reception component as described with reference to FIGS. 11 through 14.

At 1815, the base station may measure a channel quality associated with a downlink channel between the first TRP and the UE based at least in part on the SRS. The operations of 1815 may be performed according to the methods described herein. In some examples, aspects of the operations of 1815 may be performed by an SRS measurement component as described with reference to FIGS. 11 through 14.

At 1820, the base station may transmit, to the UE, a downlink transmission using a downlink precoding, the downlink precoding based at least in part on the channel quality. The operations of 1820 may be performed according to the methods described herein. In some examples, aspects of the operations of 1820 may be performed by a downlink transmission component as described with reference to FIGS. 11 through 14.

Figure 19:
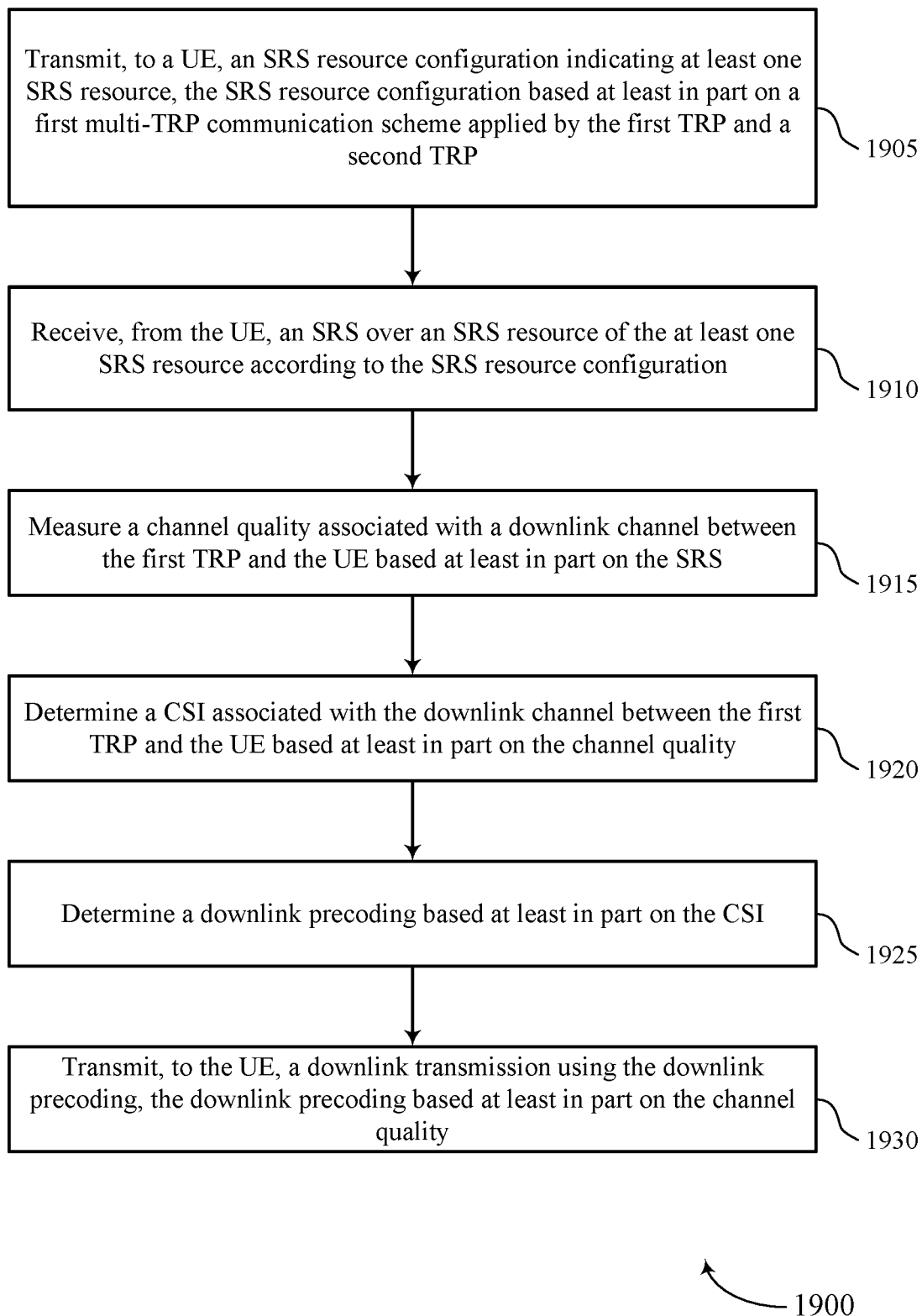

FIG. 19 shows a flowchart illustrating a method 1900 that supports techniques for deriving an SRS-based multi-TRP downlink precoding in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, an SRS resource configuration indicating at least one SRS resource, the SRS resource configuration based at least in part on a first multi-TRP communication scheme applied by the first TRP and a second TRP. The operations of 1905 may be performed according to the methods described herein. In some examples, aspects of the operations of 1905 may be performed by an SRS resource component as described with reference to FIGS. 11 through 14.

At 1910, the base station may receive, from the UE, an SRS over an SRS resource of the at least one SRS resource according to the SRS resource configuration. The operations of 1910 may be performed according to the methods described herein. In some examples, aspects of the operations of 1910 may be performed by an SRS reception component as described with reference to FIGS. 11 through 14.

At 1915, the base station may measure a channel quality associated with a downlink channel between the first TRP and the UE based at least in part on the SRS. The operations of 1915 may be performed according to the methods described herein. In some examples, aspects of the operations of 1915 may be performed by an SRS measurement component as described with reference to FIGS. 11 through 14.

At 1920, the base station may determine a CSI associated with the downlink channel between the first TRP and the UE based at least in part on the channel quality. The operations of 1920 may be performed according to the methods described herein. In some examples, aspects of the operations of 1920 may be performed by a CSI calculation component as described with reference to FIGS. 11 through 14.

At 1925, the base station may determine the downlink precoding based at least in part on the CSI, where transmitting the downlink transmission using the downlink precoding is based on determining the downlink precoding. The operations of 1925 may be performed according to the methods described herein. In some examples, aspects of the operations of 1925 may be performed by a downlink precoding component as described with reference to FIGS. 11 through 14.

At 1930, the base station may transmit, to the UE, a downlink transmission using a downlink precoding, the downlink precoding based at least in part on the channel quality. The operations of 1930 may be performed according to the methods described herein. In some examples, aspects of the operations of 1930 may be performed by a downlink transmission component as described with reference to FIGS. 11 through 14.

Figure 20:
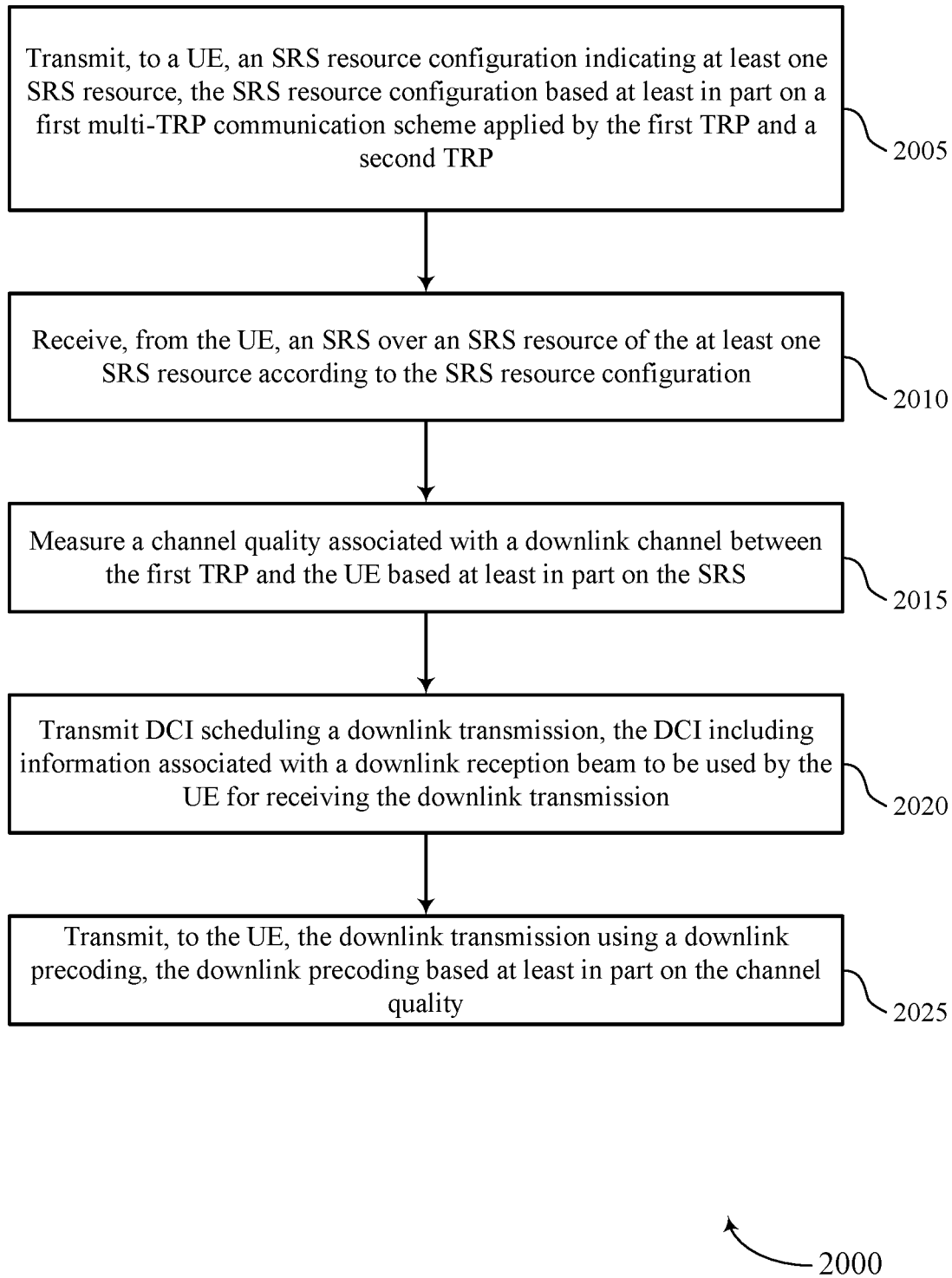

FIG. 20 shows a flowchart illustrating a method 2000 that supports techniques for deriving an SRS-based multi-TRP downlink precoding in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may transmit, to a UE, an SRS resource configuration indicating at least one SRS resource, the SRS resource configuration based at least in part on a first multi-TRP communication scheme applied by the first TRP and a second TRP. The operations of 2005 may be performed according to the methods described herein. In some examples, aspects of the operations of 2005 may be performed by an SRS resource component as described with reference to FIGS. 11 through 14.

At 2010, the base station may receive, from the UE, an SRS over an SRS resource of the at least one SRS resource according to the SRS resource configuration. The operations of 2010 may be performed according to the methods described herein. In some examples, aspects of the operations of 2010 may be performed by an SRS reception component as described with reference to FIGS. 11 through 14.

At 2015, the base station may measure a channel quality associated with a downlink channel between the first TRP and the UE based at least in part on the SRS. The operations of 2015 may be performed according to the methods described herein. In some examples, aspects of the operations of 2015 may be performed by an SRS measurement component as described with reference to FIGS. 11 through 14.

At 2020, the base station may transmit DCI scheduling a downlink transmission, the DCI including information associated with a downlink reception beam to be used by the UE for receiving the downlink transmission. The operations of 2020 may be performed according to the methods described herein. In some examples, aspects of the operations of 2020 may be performed by a downlink transmission component as described with reference to FIGS. 11 through 14.

At 2025, the base station may transmit, to the UE, the downlink transmission using a downlink precoding, the downlink precoding based at least in part on the channel quality. The operations of 2025 may be performed according to the methods described herein. In some examples, aspects of the operations of 2025 may be performed by a downlink transmission component as described with reference to FIGS. 11 through 14.

The following provides an overview of aspects of the present disclosure:

Aspect 1: A method for wireless communication at a UE, comprising: receiving an SRS resource configuration indicating at least one SRS resource, the SRS resource configuration based at least in part on a first multi-TRP communication scheme applied by two or more TRPs; transmitting one or more SRSs over the at least one SRS resource according to the SRS resource configuration; and receiving a downlink transmission from at least one of the two or more TRPs, the downlink transmission based at least in part on the one or more SRSs.

Aspect 2: The method of aspect 1, further comprising: receiving a configuration associating the at least one SRS resource with two or more downlink reference signals, each of the two or more downlink reference signals from one of the two or more TRPs.

Aspect 3: The method of aspect 2, wherein receiving the configuration associating the at least one SRS resource with the two or more downlink reference signals comprises: receiving an indication of a spatial relation between the at least one SRS resource and the two or more downlink reference signals.

Aspect 4: The method of aspect 2, wherein receiving the configuration associating the at least one SRS resource with the two or more downlink reference signals comprises: receiving an indication, for the at least one SRS resource, of an uplink TCI state associated with the two or more downlink reference signals.

Aspect 5: The method of any of aspects 2 through 4, wherein the two or more downlink reference signals comprise two or more CSI-RSs, two or more TRSs, or two or more SSBs.

Aspect 6: The method of any of aspects 1 through 5, wherein receiving the SRS resource configuration indicating the at least one SRS resource comprises: receiving an indication of one SRS resource; and wherein transmitting the one or more SRSs over the at least one SRS resource comprises: transmitting the one or more SRSs to each of the two or more TRPs over the one SRS resource.

Aspect 7: The method of aspect 6, wherein the first multi-TRP communication scheme comprises an SFN communication scheme or an SDM communication scheme.

Aspect 8: The method of any of aspects 1 through 5, wherein receiving the SRS resource configuration indicating the at least one SRS resource comprises: receiving an indication of multiple SRS resources; and wherein transmitting the one or more SRSs over the at least one SRS resource comprises: transmitting an SRS over each of the multiple SRS resources to a different one of the two or more TRPs.

Aspect 9: The method of aspect 8, wherein the first multi-TRP communication scheme comprises a TDM communication scheme or an FDM communication scheme.

Aspect 10: The method of any of aspects 1 through 5, 8, or 9, wherein receiving the SRS resource configuration indicating the at least one SRS resource comprises: receiving an SRS resource set configuration associated with an SRS resource set including a plurality of SRS resources, the plurality of SRS resources including the at least one SRS resource.

Aspect 11: The method of any of aspects 1 through 10, wherein receiving the SRS resource configuration indicating the at least one SRS resource comprises: receiving an indication of an association between each of the at least one SRS resource and one or more antenna panels of the UE; and receiving an indication of an antenna panel switching pattern for changing the association between each of the at least one SRS resource and the one or more antenna panels of the UE over time.

Aspect 12: The method of any of aspects 1 through 11, further comprising: receiving DCI scheduling the downlink transmission, the DCI including information associated with a downlink reception beam to be used by the UE; and selecting the downlink reception beam based at least in part on the information associated with the downlink reception beam included in the DCI, wherein receiving the downlink transmission is based at least in part on receiving the DCI and selecting the downlink reception beam.

Aspect 13: The method of aspect 12, wherein receiving the DCI scheduling the downlink transmission comprises: receiving a TCI codepoint associated with two or more downlink reference signals that are associated with the at least one SRS resource, wherein selecting the downlink reception beam is based at least in part on the TCI codepoint.

Aspect 14: The method of any of aspects 12 or 13, wherein receiving the DCI scheduling the downlink transmission comprises: receiving an SRS resource indicator or a TCI state associated with the at least one SRS resource, wherein selecting the downlink reception beam is based at least in part on the SRS resource indicator or the TCI state.

Aspect 15: The method of any of aspects 12 through 14, wherein the downlink transmission comprises a multi-TRP DMRS.

Aspect 16: The method of any of aspects 1 through 15, wherein the UE has a multi-beam capability, and wherein transmitting the one or more SRSs over the at least one SRS resource comprises: transmitting a first SRS to a first TRP of the two or more TRPs using a first transmit beam and a first antenna panel of the UE and a second SRS to a second TRP of the two or more TRPs using a second transmit beam and a second antenna panel of the UE simultaneously.

Aspect 17: The method of any of aspects 1 through 15, wherein the UE has a single-beam capability, and wherein transmitting the one or more SRSs over the at least one SRS resource comprises: transmitting one SRS to one of the two or more TRPs using a transmit beam and an antenna panel of the UE.

Aspect 18: The method of any of aspects 1 through 17, wherein receiving the downlink transmission from the at least one of the two or more TRPs comprises: receiving the downlink transmission from each of the two or more TRPs according to a second multi-TRP communication scheme based at least in part on the one or more SRSs.

Aspect 19: The method of aspect 18, wherein the first multi-TRP communication scheme and the second multi-TRP communication scheme comprise a TDM communication scheme, an FDM communication scheme, an SDM communication scheme, an SFN communication scheme, or any combination thereof.

Aspect 20: The method of any of aspects 1 through 17, wherein receiving the downlink transmission from the at least one of the two or more TRPs comprises: receiving the downlink transmission from one of the two or more TRPs according to a single-TRP communication scheme based at least in part on the one or more SRSs.

Aspect 21: The method of any of aspects 1 through 20, wherein the downlink transmission is associated with a downlink precoding, a rank, or a MCS that is based at least in part on the one or more SRSs.

Aspect 22: The method of aspect 21, wherein the SRS resource configuration is part of an SRS-based multi-TRP downlink precoding procedure in which the UE receives the downlink transmission associated with the downlink precoding based at least in part on transmitting the one or more SRSs to the two or more TRPs.

Aspect 23: A method for wireless communication at a first TRP, comprising: transmitting, to a UE, an SRS resource configuration indicating at least one SRS resource, the SRS resource configuration based at least in part on a first multi-TRP communication scheme applied by the first TRP and a second TRP; receiving, from the UE, an SRS over an SRS resource of the at least one SRS resource according to the SRS resource configuration; measuring a channel quality associated with a downlink channel between the first TRP and the UE based at least in part on the SRS; and transmitting, to the UE, a downlink transmission using a downlink precoding, the downlink precoding based at least in part on the channel quality.

Aspect 24: The method of aspect 23, further comprising: determining a CSI associated with the downlink channel between the first TRP and the UE based at least in part on the channel quality; and determining the downlink precoding based at least in part on the CSI, wherein transmitting the downlink transmission using the downlink precoding is based at least in part on determining the downlink precoding.

Aspect 25: The method of aspect 24, wherein transmitting the downlink transmission comprises: transmitting the downlink transmission according to a second multi-TRP scheme based at least in part on the CSI.

Aspect 26: The method of aspect 25, wherein the first multi-TRP communication scheme and the second multi-TRP communication scheme comprise a TDM communication scheme, an FDM communication scheme, an SDM communication scheme, an SFN communication scheme, or any combination thereof.

Aspect 27: The method of aspect 24, wherein transmitting the downlink transmission comprises: transmitting the downlink transmission according to a single-TRP scheme based at least in part on the CSI.

Aspect 28: The method of any of aspects 23 through 27, further comprising: transmitting, to the UE, a configuration associating the at least one SRS resource with two or more downlink reference signals, the two or more downlink reference signals including a first downlink reference signal from the first TRP and a second downlink reference signal from the second TRP.

Aspect 29: The method of aspect 28, wherein transmitting the configuration associating the at least one SRS resource with the two or more downlink reference signals comprises: transmitting an indication of a spatial relation between the at least one SRS resource and the two or more downlink reference signals.

Aspect 30: The method of aspect 28, wherein transmitting the configuration associating the at least one SRS resource with the two or more downlink reference signals comprises: transmitting an indication, for the at least one SRS resource, of an uplink TCI state associated with the two or more downlink reference signals.

Aspect 31: The method of any of aspects 28 through 30, wherein the two or more downlink reference signals comprise two or more CSI-RSs, two or more TRSs, or two or more SSBs.

Aspect 32: The method of any of aspects 23 through 31, wherein transmitting the SRS resource configuration indicating the at least one SRS resource comprises: transmitting an indication of one SRS resource, the one SRS resource assigned for an SRS transmission to the first TRP and the second TRP; and wherein receiving the SRS over the SRS resource of the at least one SRS resource comprises: receiving the SRS over the one SRS resource.

Aspect 33: The method of aspect 32, wherein the first multi-TRP communication scheme comprises an SFN communication scheme or an SDM communication scheme.

Aspect 34: The method of any of aspects 23 through 31, wherein transmitting the SRS resource configuration indicating the at least one SRS resource comprises: transmitting an indication of multiple SRS resources including a first SRS resource and a second SRS resource, the first SRS resource assigned for a first SRS transmission to the first TRP and the second SRS resource assigned for a second SRS transmission to the second TRP; and wherein receiving the SRS over the SRS resource of the at least one SRS resource comprises: receiving the SRS over the first SRS resource assigned for the first SRS transmission to the first TRP.

Aspect 35: The method of aspect 34, wherein the first multi-TRP communication scheme comprises a TDM communication scheme or an FDM communication scheme.

Aspect 36: The method of any of aspects 23 through 31, 34, or 35, wherein transmitting the SRS resource configuration indicating the at least one SRS resource comprises: transmitting an SRS resource set configuration associated with an SRS resource set including a plurality of SRS resources, the plurality of SRS resources including the at least one SRS resource.

Aspect 37: The method of any of aspects 23 through 36, wherein transmitting the SRS resource configuration indicating the at least one SRS resource comprises: transmitting an indication of an association between each of the at least one SRS resource and one or more antenna panels of the UE; and transmitting an indication of an antenna panel switching pattern for changing the association between each of the at least one SRS resource and the one or more antenna panels of the UE over time.

Aspect 38: The method of any of aspects 23 through 37, further comprising: transmitting DCI scheduling the downlink transmission, the DCI including information associated with a downlink reception beam to be used by the UE for receiving the downlink transmission.

Aspect 39: The method of aspect 38, wherein transmitting the DCI scheduling the downlink transmission comprises: transmitting a TCI codepoint associated with two or more downlink reference signals that are associated with the at least one SRS resource, wherein the information associated with the downlink reception beam includes the TCI codepoint.

Aspect 40: The method of any of aspects 38 through 39, wherein transmitting the DCI scheduling the downlink transmission comprises: transmitting an SRS resource indicator or a TCI state associated with the at least one SRS resource, wherein the information associated with the downlink reception beam includes the SRS resource indicator or the TCI state.

Aspect 41: The method of any of aspects 38 through 40, wherein the downlink transmission comprises a multi-TRP DMRS.

Aspect 42: The method of any of aspects 23 through 41, wherein the SRS resource configuration is part of an SRS-based multi-TRP downlink precoding procedure in which the first TRP transmits the downlink transmission using the downlink precoding based at least in part on receiving the SRS from the UE.

Aspect 43: An apparatus for wireless communication at a UE comprising at least one processor and memory coupled to the at least one processor, the at least one processor and memory configured to perform a method of any of aspects 1 through 22.

Aspect 44: An apparatus for wireless communication at a UE comprising at least one means for performing a method of any of aspects 1 through 22.

Aspect 45: A non-transitory computer-readable medium storing code for wireless communication at a UE the code comprising instructions executable by at least one processor to perform a method of any of aspects 1 through 22.

Aspect 46: An apparatus for wireless communication at a first TRP comprising at least one processor and memory coupled to the at least one processor, the at least one processor and memory configured to perform a method of any of aspects 23 through 42.

Aspect 47: An apparatus for wireless communication at a first TRP comprising at least one means for performing a method of any of aspects 23 through 42.

Aspect 48: A non-transitory computer-readable medium storing code for wireless communication at a first TRP the code comprising instructions executable by at least one processor to perform a method of any of aspects 23 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein. Components within a wireless communication system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information) or accessing (such as accessing data in a memory). Also, "determining" can include resolving, selecting, choosing, or establishing.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a sounding reference signal resource configuration indicating a quantity of sounding reference signal resources, wherein the quantity of sounding reference signal resources indicated by the sounding reference signal resource configuration is based at least in part on a type of a first multi-transmission and reception point communication scheme used for downlink communications performed by two or more transmission and reception points;
   transmitting one or more sounding reference signals over the quantity of sounding reference signal resources according to the sounding reference signal resource configuration; and
   receiving a downlink transmission from at least one of the two or more transmission and reception points in accordance with a downlink precoding, wherein the downlink precoding of the downlink transmission is based at least in part on one or more channel quality measurements, the one or more channel quality measurements based at least in part on the one or more sounding reference signals.

2. The method of claim 1, further comprising:
   receiving a configuration associating the quantity of sounding reference signal resources with two or more downlink reference signals, each of the two or more downlink reference signals from one of the two or more transmission and reception points.

3. The method of claim 2, wherein receiving the configuration associating the quantity of sounding reference signal resources with the two or more downlink reference signals comprises:
   receiving an indication of a spatial relation between the quantity of sounding reference signal resources and the two or more downlink reference signals.

4. The method of claim 2, wherein receiving the configuration associating the quantity of sounding reference signal resources with the two or more downlink reference signals comprises:
   receiving an indication, for the quantity of sounding reference signal resources, of an uplink transmission configuration indicator state associated with the two or more downlink reference signals.

5. The method of claim 2, wherein the two or more downlink reference signals comprise two or more channel state information reference signals, two or more tracking reference signals, or two or more synchronization signal blocks.

6. The method of claim 1, wherein receiving the sounding reference signal resource configuration indicating the quantity of sounding reference signal resources comprises:
   receiving an indication of one sounding reference signal resource, and wherein transmitting the one or more sounding reference signals over the quantity of sounding reference signal resources comprises:
      transmitting the one or more sounding reference signals to each of the two or more transmission and reception points over the one sounding reference signal resource, wherein the first multi-transmission and reception point communication scheme comprises a single-frequency network communication scheme or a space-division multiplexing communication scheme.

7. The method of claim 1, wherein receiving the sounding reference signal resource configuration indicating the quantity of sounding reference signal resources comprises:
   receiving an indication of multiple sounding reference signal resources, and wherein transmitting the one or more sounding reference signals over the quantity of sounding reference signal resources comprises:
      transmitting a sounding reference signal over each of the multiple sounding reference signal resources to a different one of the two or more transmission and reception points, wherein the first multi-transmission and reception point communication scheme comprises a time-division multiplexing communication scheme or a frequency-division multiplexing communication scheme.

8. The method of claim 1, wherein receiving the sounding reference signal resource configuration indicating the quantity of sounding reference signal resources comprises:
   receiving a sounding reference signal resource set configuration associated with a sounding reference signal resource set including a plurality of sounding reference signal resources, the plurality of sounding reference signal resources including the quantity of sounding reference signal resources.

9. The method of claim 1, wherein receiving the sounding reference signal resource configuration indicating the quantity of sounding reference signal resources comprises:
   receiving an indication of an association between each of the quantity of sounding reference signal resources and one or more antenna panels of the UE; and
   receiving an indication of an antenna panel switching pattern for changing the association between each of the quantity of sounding reference signal resources and the one or more antenna panels of the UE over time.

10. The method of claim 1, further comprising:
    receiving downlink control information scheduling the downlink transmission, the downlink control information including information associated with a downlink reception beam to be used by the UE; and
    selecting the downlink reception beam based at least in part on the information associated with the downlink reception beam included in the downlink control information, wherein receiving the downlink transmission is based at least in part on receiving the downlink control information and selecting the downlink reception beam.

11. The method of claim 10, wherein receiving the downlink control information scheduling the downlink transmission comprises:

receiving a transmission configuration indicator codepoint associated with two or more downlink reference signals that are associated with the quantity of sounding reference signal resources, wherein selecting the downlink reception beam is based at least in part on the transmission configuration indicator codepoint.

12. The method of claim 10, wherein receiving the downlink control information scheduling the downlink transmission comprises:
receiving a sounding reference signal resource indicator or a transmission configuration indicator state associated with the quantity of sounding reference signal resources, wherein selecting the downlink reception beam is based at least in part on the sounding reference signal resource indicator or the transmission configuration indicator state.

13. The method of claim 10, wherein the downlink transmission comprises a multi-transmission and reception point demodulation reference signal.

14. The method of claim 1, wherein the UE has a multi-beam capability, and wherein transmitting the one or more sounding reference signals over the quantity of sounding reference signal resources comprises:
transmitting a first sounding reference signal to a first transmission and reception point of the two or more transmission and reception points using a first transmit beam and a first antenna panel of the UE and a second sounding reference signal to a second transmission and reception point of the two or more transmission and reception points using a second transmit beam and a second antenna panel of the UE simultaneously.

15. The method of claim 1, wherein the UE has a single-beam capability, and wherein transmitting the one or more sounding reference signals over the quantity of sounding reference signal resources comprises:
transmitting one sounding reference signal to one of the two or more transmission and reception points using a transmit beam and an antenna panel of the UE.

16. The method of claim 1, wherein receiving the downlink transmission from the at least one of the two or more transmission and reception points comprises:
receiving the downlink transmission from each of the two or more transmission and reception points according to a second multi-transmission and reception point communication scheme based at least in part on the one or more sounding reference signals.

17. The method of claim 16, wherein the first multi-transmission and reception point communication scheme and the second multi-transmission and reception point communication scheme comprise a time-division multiplexing communication scheme, a frequency-division multiplexing communication scheme, a space-division multiplexing communication scheme, a single-frequency network communication scheme, or any combination thereof.

18. The method of claim 1, wherein receiving the downlink transmission from the at least one of the two or more transmission and reception points comprises:
receiving the downlink transmission from one of the two or more transmission and reception points according to a single-transmission and reception point communication scheme based at least in part on the one or more sounding reference signals.

19. The method of claim 1, wherein the downlink transmission is associated with a rank or a modulation and coding scheme that is based at least in part on the one or more sounding reference signals.

20. The method of claim 19, wherein the sounding reference signal resource configuration is part of a sounding reference signal-based multi-transmission and reception point downlink precoding procedure in which the UE receives the downlink transmission associated with the downlink precoding based at least in part on transmitting the one or more sounding reference signals to the two or more transmission and reception points.

21. A method for wireless communication at a first transmission and reception point, comprising:
transmitting, to a user equipment (UE), a sounding reference signal resource configuration indicating a quantity of sounding reference signal resources, wherein the quantity of sounding reference signal resource indicated by the sounding reference signal resource configuration is based at least in part on a type of a first multi-transmission and reception point communication scheme used for downlink communications performed by the first transmission and reception point and a second transmission and reception point;
receiving, from the UE, a sounding reference signal over a sounding reference signal resource of the quantity of sounding reference signal resources according to the sounding reference signal resource configuration;
measuring a channel quality associated with a downlink channel between the first transmission and reception point and the UE based at least in part on the sounding reference signal; and
transmitting, to the UE, a downlink transmission using a downlink precoding, the downlink precoding based at least in part on the channel quality.

22. The method of claim 21, further comprising:
determining a channel state information associated with the downlink channel between the first transmission and reception point and the UE based at least in part on the channel quality; and
determining the downlink precoding based at least in part on the channel state information, wherein transmitting the downlink transmission using the downlink precoding is based at least in part on determining the downlink precoding.

23. The method of claim 22, wherein transmitting the downlink transmission comprises:
transmitting the downlink transmission according to a second multi-transmission and reception point scheme based at least in part on the channel state information.

24. The method of claim 22, wherein transmitting the downlink transmission comprises:
transmitting the downlink transmission according to a single-transmission and reception point scheme based at least in part on the channel state information.

25. The method of claim 21, further comprising:
transmitting, to the UE, a configuration associating the quantity of sounding reference signal resources with two or more downlink reference signals, the two or more downlink reference signals including a first downlink reference signal from the first transmission and reception point and a second downlink reference signal from the second transmission and reception point.

26. The method of claim 21, wherein transmitting the sounding reference signal resource configuration indicating the quantity of sounding reference signal resources comprises:
transmitting an indication of one sounding reference signal resource, the one sounding reference signal resource assigned for a sounding reference signal transmission to the first transmission and reception point and the second transmission and reception point;

and wherein receiving the sounding reference signal over the sounding reference signal resource of the quantity of sounding reference signal resources comprises:

receiving the sounding reference signal over the one sounding reference signal resource.

27. A user equipment (UE), comprising:
one or more processors; and
one or more memories coupled to the one or more processors and storing instructions executable by the one or more processors to cause the UE to:
receive a sounding reference signal resource configuration indicating quantity of sounding reference signal resources, wherein the quantity of sounding reference signal resources indicated by the sounding reference signal resource configuration is based at least in part on a type of a first multi-transmission and reception point communication scheme used for downlink communications performed by two or more transmission and reception points;
transmit one or more sounding reference signals over the quantity of sounding reference signal resources according to the sounding reference signal resource configuration; and
receive a downlink transmission from at least one of the two or more transmission and reception points in accordance with a downlink precoding, wherein the downlink precoding of the downlink transmission is based at least in part on one or more channel quality measurements, the one or more channel quality measurements based at least in part on the one or more sounding reference signals.

28. The UE of claim 27, wherein the instructions are further executable by the one or more processors to cause the UE to:
receive a configuration associating the quantity of sounding reference signal resources with two or more downlink reference signals, each of the two or more downlink reference signals from one of the two or more transmission and reception points.

29. A first transmission and reception point, comprising:
one or more processors; and
one or more memories coupled to the one or more processors and storing instructions executable by the one or more processors to cause the first transmission and reception point to:
transmit, to a user equipment (UE), a sounding reference signal resource configuration indicating a quantity of sounding reference signal resources, wherein the quantity of sounding reference signal resources indicated by the sounding reference signal resource configuration is based at least in part on a type of a first multi-transmission and reception point communication scheme used for downlink communications performed by the first transmission and reception point and a second transmission and reception point;
receive, from the UE, a sounding reference signal over a sounding reference signal resource of the quantity of sounding reference signal resources according to the sounding reference signal resource configuration;
measure a channel quality associated with a downlink channel between the first transmission and reception point and the UE based at least in part on the sounding reference signal; and
transmit, to the UE, a downlink transmission using a downlink precoding, the downlink precoding based at least in part on the channel quality.

30. The first transmission and reception point of claim 29, wherein the instructions are further executable by the one or more processors to cause the first transmission and reception point to:
determine a channel state information associated with the downlink channel between the first transmission and reception point and the UE based at least in part on the channel quality; and
determine the downlink precoding based at least in part on the channel state information, wherein transmitting the downlink transmission using the downlink precoding is based at least in part on determining the downlink precoding.

* * * * *